US011505739B2

United States Patent
Kabe et al.

(10) Patent No.: US 11,505,739 B2
(45) Date of Patent: Nov. 22, 2022

(54) LONG-PERSISTENT LUMINESCENT COMPOSITION, LONG-PERSISTENT LUMINESCENT DEVICE AND WAVELENGTH CONTROL METHOD

(71) Applicant: Okinawa Institute of Science and Technology School Corporation, Okinawa (JP)

(72) Inventors: Ryota Kabe, Fukuoka (JP); Kazuya Jinnai, Fukuoka (JP); Chihaya Adachi, Itoshima (JP)

(73) Assignee: OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 285 days.

(21) Appl. No.: 16/637,879

(22) PCT Filed: Aug. 7, 2018

(86) PCT No.: PCT/JP2018/029660
§ 371 (c)(1),
(2) Date: Feb. 10, 2020

(87) PCT Pub. No.: WO2019/031524
PCT Pub. Date: Feb. 14, 2019

(65) Prior Publication Data
US 2020/0165516 A1 May 28, 2020

(30) Foreign Application Priority Data

Aug. 9, 2017 (JP) .............................. JP2017-154500
Oct. 2, 2017 (JP) .............................. JP2017-192677
Dec. 8, 2017 (JP) .............................. JP2017-236420

(51) Int. Cl.
*C09K 11/06* (2006.01)
*G09F 13/20* (2006.01)

(52) U.S. Cl.
CPC .............. *C09K 11/06* (2013.01); *G09F 13/20* (2013.01)

(58) Field of Classification Search
CPC ..................................................... C09K 11/06
See application file for complete search history.

(56) References Cited

U.S. PATENT DOCUMENTS 6,375,864 B1  4/2002 Phillips et al.
6,863,997 B2  3/2005 Thompson et al.
(Continued)

FOREIGN PATENT DOCUMENTS

JP  2006-206618 A   8/2006
JP  2010-245061 A  10/2010
(Continued)

OTHER PUBLICATIONS

International Preliminary Report On Patentability for corresponding PCT International Application No. PCT/JP2018/029660, dated Feb. 11, 2020, with English translation.
(Continued)

*Primary Examiner* — C Melissa Koslow
(74) *Attorney, Agent, or Firm* — Browdy and Neimark, PLLC

(57) ABSTRACT

An organic long-persistent luminescent composition containing a first organic compound, a second organic compound and a third organic compound and satisfying the following expression (1) is a long-persistent luminescent material that facilitates emission color control. $E_{S1}(A)$ represents a lowest excited singlet energy level of emission from the first organic compound and the second organic compound, $E_{S1}(B)$ represents a lowest excited singlet energy level of the third organic compound.

$$E_{S1}(B) - E_{S1}(A) \leq 0.15 \text{ eV} \qquad (1)$$

13 Claims, 8 Drawing Sheets

(56) References Cited

U.S. PATENT DOCUMENTS

| | | |
|---|---|---|
| 10,301,540 B2 | 5/2019 | Kabe et al. |
| 2008/0121815 A1 | 5/2008 | Agrawal et al. |
| 2018/0346807 A1* | 12/2018 | Kabe .................. C09K 11/06 |

FOREIGN PATENT DOCUMENTS

| | | |
|---|---|---|
| JP | 2012-212879 A | 11/2012 |
| JP | 2015-144224 A | 8/2015 |
| JP | 2015-179809 A | 10/2015 |
| JP | 2018-088521 A | 6/2018 |
| WO | 2017/122492 A1 | 7/2017 |

OTHER PUBLICATIONS

International Search Report for corresponding PCT International Application No. PCT/JP2018/029660.
Supplementary European Search Report dated Dec. 11, 2020 in corresponding European Patent Application No. 18843384.1.
Zhou, D. et al., Host to guest energy transfer mechanism in phosphorescent and fluorescent organic light-emitting devices utilizing exciplex-forming hosts, The Journal of Physical Chemistry C, vol. 118, No. 41, 24006-24012 (2014).
Shin, H. et al.. Blue phosphorescent organic light-emitting diodes using an exciplex forming co-host with the external quantum efficiency of theoretical limit, Asvances Materials, vol. 26, No. 27, p. 4730-4734 (2014).
Hansch, C. et al., A survey of Hammett substitute constants and resonance and filed parameters, Chem. Rev., 91, 165-195 (1991).

\* cited by examiner

LONG-PERSISTENT LUMINESCENT COMPOSITION, LONG-PERSISTENT LUMINESCENT DEVICE AND WAVELENGTH CONTROL METHOD

TECHNICAL FIELD

The present invention relates to a long-persistent luminescent composition and a long-persistent luminescent device capable of facilitating emission wavelength control. The invention also relates to a wavelength control method for a long-persistent luminescent material.

BACKGROUND ART

Long-persistent luminescent materials are luminescent materials which store energy during application of excitation light and emit light using the stored energy even after the application of excitation light has stopped. Long-persistent luminescent materials are used as luminescent paints for watch and clock dials which glow in the dark or at night, letters and diagrams of signs and guideboards and the like, and these materials have been recently applied to lights which can produce light with stored light energy without electricity supply.

Of these long-persistent luminescent materials, inorganic salts containing rare earth elements such as Eu, Ce and Tb are especially known as long-persistent luminescent materials which exhibit long-lived luminescence (for example, see PTL 1).

CITATION LIST

Patent Literature

PTL 1: JP 2006-206618 A

SUMMARY OF INVENTION

Technical Problem

The long-persistent luminescent materials composed of inorganic salts (inorganic long-persistent luminescent materials), however, have the following problems: they contain a rare earth element, they require a high-temperature process, and they are insoluble in solvent. Consequently, the present inventors have advanced assiduous studies for the purpose of providing a long-persistent luminescent material system that enables emission wavelength control, using an organic material.

Solution to Problem

As a result of assiduous investigations, the inventors have found that, by adding a third organic compound satisfying a predetermined requirement to a long-persistent luminescent material composed of a first organic compound and a second organic compound, a long-persistent emission color can be controlled. The invention is proposed based on the findings and has the following configuration.

An organic long-persistent luminescent composition containing a first organic compound, a second organic compound and a third organic compound and satisfying the following expression (1):

$$E_{S1}(B)-E_{S1}(A) \leq 0.15 \text{ eV} \tag{1}$$

wherein $E_{S1}(A)$ represents a lowest excited singlet energy level of emission from the first organic compound and the second organic compound, $E_{S1}(B)$ represents a lowest excited singlet energy level of the third organic compound, and the unit of $E_{S1}(A)$ and $E_{S1}(B)$ is eV.

The long-persistent luminescent composition according to [1], satisfying the following expression (2):

$$0 \text{ eV} < E_{S1}(B)-E_{S1}(A) \leq 0.15 \text{ eV} \tag{2}$$

The long-persistent luminescent composition according to [1], satisfying the following expression (3):

$$E_{S1}(B)-E_{S1}(A) < 0 \text{ eV} \tag{3}$$

The long-persistent luminescent composition according to any one of [1] to [3], wherein the composition composed of the first organic compound and the second organic compound is a long-persistent luminescent material.

The long-persistent luminescent composition according to any one of [1] to [4], wherein the first organic compound and the second organic compound form an exciplex through application of light to the long-persistent luminescent composition.

The long-persistent luminescent composition according to any one of [1] to [5], wherein the first organic compound is an electron-donating compound, and the second organic compound is an electron-accepting compound.

The long-persistent luminescent composition according to any one of [1] to [6], wherein the third organic compound forms an aggregate.

The long-persistent luminescent composition according to [7], wherein the aggregate is an excimer.

The long-persistent luminescent composition according to any one of [1] to [8], wherein the third organic compound is a fluorescent material.

A long-persistent luminescent device having a long-persistent luminescent composition of any one of [1] to [9] on a support.

A method of controlling an emission wavelength of a long-persistent luminescent material that contains a first organic compound and a second organic compound, which comprises:
adding a third organic compound satisfying the following expression (1) to the long-persistent luminescent material:

$$E_{S1}(B)-E_{S1}(A) \leq 0.15 \text{ eV} \tag{1}$$

wherein $E_{S1}(A)$ represents a lowest excited singlet energy level of emission from the first organic compound and the second organic compound, $E_{S1}(B)$ represents a lowest excited singlet energy level of the third organic compound, and the unit of $E_{S1}(A)$ and $E_{S1}(B)$ is eV.

The wavelength control method according to [11], wherein the third organic compound satisfies the following expression (2):

$$0 \text{ eV} < E_{S1}(B)-E_{S1}(A) \leq 0.15 \text{ eV} \tag{2}$$

The wavelength control method according to [12], wherein the emission wavelength of the long-persistent luminescent material is controlled to a short wavelength side by adding the third compound.

The wavelength control method according to [11], wherein the third organic compound satisfies the following expression (3):

$$E_{S1}(B)-E_{S1}(A) < 0 \text{ eV} \tag{3}$$

The wavelength control method according to [14], wherein the emission wavelength of the long-persistent luminescent material is controlled to a long wavelength side by adding the third compound.

Advantageous Effects of Invention

According to the invention, the emission wavelength of a long-persistent luminescent material can be controlled easily. In addition, a red light that could be hardly realized by an already-existing, inorganic long-persistent luminescent material can be emitted at a high color purity, and a white light can also be realized.

DESCRIPTION OF EMBODIMENTS

Figure 1A:
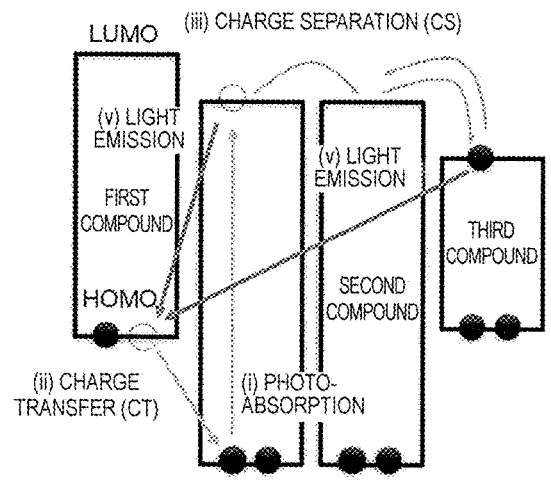
FIGS. 1A-1C Schematic figures illustrating a luminescence mechanism of a long-persistent luminescent composition of the invention.

The contents of the invention are explained in detail below. Although the explanations of the constituent features described below are sometimes given based on typical embodiments or specific examples of the invention, the invention is not limited to the embodiments or the specific examples. A range indicated using "to" in this description means a range which includes the values before and after "to" as the lower limit and the upper limit, respectively.

Isotope species of a hydrogen atom present in the molecule of a compound used in the invention is not particularly limited. For example, all the hydrogen atoms in a molecule may be $^1$H, or a part or all of the hydrogen atoms may be $^2$H (deuterium D).

The "room temperature" in this description means 20° C.

In this description, "excitation light" is a light to excite a targeted substance to provide light emission, and for this, a light whose wavelength correspond to the absorption wavelength of the targeted substance can be used.

An "electron-withdrawing group" in this description means a substituent with a positive Hammett $\sigma_p$ value, and an "electron-donating group" means a substituent with a negative Hammett $\sigma_p$ value. For the explanations of Hammett $\sigma_p$ values and the values of specific substituents, the descriptions of $\sigma_p$ values in Hansch, C. et. al., Chem. Rev., 91, 165-195 (1991) can be referred to.

[Long-Persistent Luminescent Composition]

The long-persistent luminescent composition of the invention contains a first organic compound, a second organic compound and a third organic compound. In addition, the long-persistent luminescent composition of the invention satisfies the following expression (1).

$$E_{S1}(B)-E_{S1}(A) \leq 0.15 \text{ eV} \tag{1}$$

In the expression (1), $E_{S1}(A)$ represents a lowest excited singlet energy level of emission from the first organic compound and the second organic compound, $E_{S1}(B)$ represents a lowest excited singlet energy level of the third organic compound, and the unit of $E_{S1}(A)$ and $E_{S1}(B)$ is eV.

According to the invention, a third organic compound satisfying a relationship of the expression (1) is used in a long-persistent luminescent material formed by a first organic compound and a second organic compound to readily control the emission wavelength of the long-persistent luminescent material. For example, using a third organic compound satisfying the following expression (2), the emission wavelength of a long-persistent luminescent material can be relatively readily controlled to a short wavelength side.

$$0 \text{ eV} < E_{S1}(B)-E_{S1}(A) \leq 0.15 \text{ eV} \tag{2}$$

Also, for example, using a third organic compound satisfying the following expression (3), the emission wavelength of a long-persistent luminescent material can be relatively readily controlled to a long wavelength side. With that, for example, red light emission with a high color purity can be realized.

$$E_{S1}(B)-E_{S1}(A) < 0 \text{ eV} \tag{3}$$

Accordingly, using a suitable third organic compound in a long-persistent luminescent material containing a first organic compound and a second organic compound, there can be provided a long-persistent luminescent composition controlled to have a desired emission wavelength. In addition, appropriately selecting a third organic compound, there can be provided a huge variety of long-persistent luminescent compositions capable of emitting different colors.

The emission wavelength shift width to be controlled by further using a third organic compound in a long-persistent luminescent material containing a first organic compound and a second organic compound may be, for example, 5 nm or more, 10 nm or more, 20 nm or more, 40 nm or more, 70 nm or more, 100 nm or more, or 130 nm or more. Also the emission wavelength shift width to be controlled by further using a third organic compound in a long-persistent luminescent material containing a first organic compound and a second organic compound may be, for example, 300 nm or less, 200 nm or less, or 150 nm or less. Such wavelength control can be realized by occurrence of energy transfer from a long-persistent luminescent material containing a first organic compound and a second organic compound to a third organic compound. Wavelength control width as referred to herein means a shift width of a peak wavelength.

A value of $E_{S1}(B)-E_{S1}(A)$ can also be selected from a range of, for example, −0.1 eV or less, −0.2 eV or less, −0.3 eV or less, −0.4 eV or less, −0.5 eV or less, or −0.6 eV or less.

Preferably, the "first organic compound" in the invention is a molecule that releases an electron to be in a radical cation state through application of light to the long-persistent luminescent composition, and the "second organic compound" in the invention is a molecule that receives the electron released by the first organic compound to be in a radical anion state. Existence of a radical such as "radical cation" and a "radical anion" can be confirmed by ESR (electron spin response) spectroscopy or the like.

In the invention, the "long-persistent luminescent material" is a material that contains such a first organic compound and a second organic compound, and emits light by application of light thereto, and can continue to emit light even after the application of light thereto has stopped. Here, in this description, light emission after the point at which application of light has stopped may be referred to as "long-persistent luminescence", and the time from the point at which application of light has stopped to the point at which no emission intensity has become detected may be referred to as "long-persistent luminescence time". The long-persistent luminescent material as referred to in this application means a long-persistent luminescent material having a long-persistent luminescence time of 0.1 seconds or more, and the long-persistent luminescence time of the long-persistent luminescent material of the invention is preferably 1 second or more, more preferably 5 seconds or more, even more preferably 5 minutes or more, further more preferably 20 minutes or more.

The emission intensity can be measured using, for example, a spectrometer (PMA-50, manufactured by Hamamatsu Photonics K.K.). The emission intensity of less than 0.01 mcd/m$^2$ can be considered as undetectable.

By adding a third organic compound to the long-persistent luminescent material containing a first organic compound and a second organic compound, the emission wavelength of the resultant long-persistent luminescent material can be thereby controlled. In the invention, the composition containing such a first organic compound, a second organic compound and a third organic compound is referred to as a "long-persistent luminescent composition".

Figure 1B:
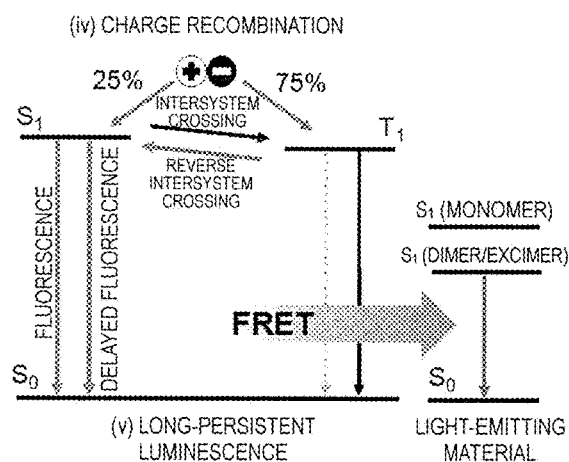
Figure 1C:
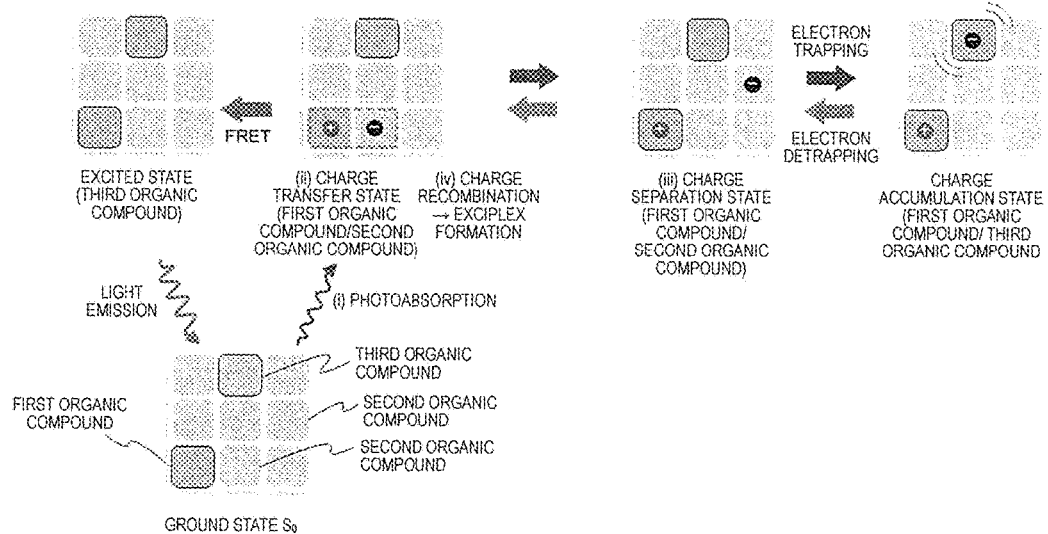

Emission of the long-persistent luminescent composition of the invention is presumed to occur according to the luminescence mechanism shown by the schematic views in FIG. 1. The luminescence mechanism of a long-persistent luminescent composition is described below. In FIG. 1, (a) shows an electron transfer process in a long-persistent luminescent composition; (b) shows an energy state transition process in a long-persistent luminescent composition. FIG. 1(c) shows, as a planar view, an electron transfer process in the case where a third organic compound has a trap function. In each view of FIG. 1(c), a region surrounded by a black frame in the left side column represents a first organic compound, a region surrounded by a black frame in the center column represents a third organic compound, and the other regions each represents a second organic compound. The charge accumulation state by an electron trap of a third organic compound shown in FIG. 1(c) is not an indispensable step in the invention. A Roman number in a parenthesis in the following description corresponds to a Roman number in a parenthesis in FIG. 1, indicating a sequential order of each emission process. However, the luminescence mechanism of the long-persistent luminescent composition of the invention should not be limitatively interpreted by the luminescence mechanism described below.

First, when light is applied to a long-persistent luminescent composition, as shown in FIG. 1(a), a second organic compound absorbs the light, and an electron is transferred from the HOMO (Highest Occupied Molecular Orbital) to the LUMO (Lowest Unoccupied Molecular Orbital) (i), and an electron moves from the HOMO of a first organic compound to the HOMO of the second organic compound (ii). Or direct electron transition occurs through photoabsorption to the LUMO of the second organic compound from the HOMO of the first organic compound. As a result, a charge transfer state of the first organic compound with holes formed in the HOMO thereof (the first organic compound in a radical cation state) and the second organic compound with excessive electrons transferred into the LUMO thereof (the second organic compound in a radical anion state) forms. The electron that has been transferred to the LUMO of the second organic compound separates from the second organic compound and moves to the LUMO of a neighboring second organic compound, from one to another, and thus diffuses (iii). When the diffused electron reaches the LUMO of the second organic compound adjacent to a third organic compound, the electron moves to the LUMO of the third organic compound and then recombines with the hole of the first organic compound. By the recombination energy, the first organic compound and the second organic compound associate together to form an exciplex (excited state).

As shown in FIG. 1(b), the probabilities of the excited singlet state $S_1$ and the excited triplet state $T_1$ in the excited states are 25% and 75%, respectively, and when these excited states return to a ground state, light is emitted (v). The light emission route is considered to include the following routes (a) to (e). Specifically, of a long-persistent luminescent material, (a) fluorescence is emitted when the excited singlet state $S_1$ returns to the ground state, and (b) phosphorescence is emitted when the excited triplet state $T_1$ returns to the ground state. Alternatively, (c) reverse intersystem crossing occurs from the excited triplet state $T_1$ to the excited singlet state $S_1$, and fluorescence (delayed fluorescence) is emitted when the excited singlet state $S_1$ returns to the ground state. Further, (d) intersystem crossing occurs from the excited singlet state $S_1$ to the excited triplet state $T_1$, and phosphorescence is emitted when the excited triplet state $T_1$ returns to the ground state. With that, (e) in the case where a third organic compound is a fluorescent material, the energy of the excited singlet state $S_1$ of a long-persistent luminescent material moves to the third organic compound according to a Foerster resonance energy transfer (FRET) mechanism or Dexter energy transfer so that the third organic compound transits to the excited singlet state $S_1$, and when the excited singlet state $S_1$ returns to the ground state, fluorescence is emitted.

In the above-mentioned emission mechanism, a long-persistent luminescent material forms an exciplex to emit light, as confirmed by the emission spectrum of the long-persistent luminescent material that differs from the emission spectrum given by a first organic compound alone or the emission spectrum given by a second organic compound alone. Examples of different emission spectral patterns include a case differing in the emission maximum wavelength, a case differing in a full width at half maximum or in inclination of rising, and a case differing in the number of emission peaks. In such a mode of emission by exciplex formation, a difference $\Delta E_{ST}$ between the lowest excited singlet energy level and the lowest excited triplet energy level is extremely small owing to spatial separation of a first organic compound from a second organic compound, and therefore reverse intersystem crossing from the excited triplet state $T_1$ to the excited single state $S_1$ tends to occur easily. Accordingly, the energy of the excited triplet state $T_1$ can also be effectively utilized for fluorescence emission and a high emission efficiency can be attained. Here, the fluorescence through such reverse intersystem crossing is a fluorescence to be observed later than the fluorescence from the excited singlet state $S_1$ directly transferred from the ground state and is called "delayed fluorescence" in this description.

As described above, a long-persistent luminescent material has emission routes (a) to (e), and emission from a long-persistent luminescent material may be at least any one route of those routes (a) to (e), that is, a long-persistent luminescent material may emit light in any one route of (a) to (e), or in a combination of two or more of (a) to (e).

A third organic compound may emit light in a state of monomers of independent molecules (in a state that is not aggregated), or may emit light in a state where molecules of an excited third organic compound have aggregated to form an excimer and the excimer emits light. The light from the excimer tends to have a longer wavelength than that of the light emitted from a non-aggregated compound. Consequently, by using emission from such an excimer, the emitted color from a long-persistent luminescent composition can be more readily controlled to have a longer wavelength.

Here, the emission mechanism is described with reference to an example where a third organic compound is a fluorescent material, but also in other cases where a phosphorescent material or a delayed fluorescent material is used as a third organic compound, emission may occur in the same mechanism. Here, in another route in place of (e) where a third organic compound is a phosphorescent material, the third organic compound transits to the excited triplet state $T_1$ by the excited triplet energy having moved from a long-persistent luminescent material through a Dexter energy transfer mechanism, and when the excited triplet state $T_1$ returns to the ground state, phosphorescence is emitted. In the case where a third organic compound is a delayed fluorescent material, after the third organic compound has transited to the excited triplet state $T_1$ by the excited triplet energy having moved from a long-persistent luminescent material through a Dexter energy transfer mechanism, reverse intersystem crossing occurs from the excited triplet state $T_1$ to the excited singlet state $S_1$. When the excited singlet state $S_1$ returns to the ground state, fluorescence is emitted.

As shown in FIG. 1(c), a third organic compound having received electrons from a second organic compound via (i) photoabsorption, (ii) a charge transfer state and (iii) a charge separation state may plays a role of a trapping function (electron trapping-electron detrapping function) such that the compound once traps and accumulates the electrons and thereafter releases the electrons by thermal activation or the like to return the electrons to the second organic compound. In this case, the electrons transferred from the third organic compound to the second organic compound move between the second organic compounds and recombine with holes of a first organic compound (iv). As a result of such charge recombination, an exciplex is formed between the first organic compound and the second organic compound, thereby emitting light through the above-mentioned routes (a) to (d). In addition, (e) the excited energy of the exciplex moves to the third organic compound through Foerster resonance energy transfer (FRET) or Dexter energy transfer, and the third organic compound thus emits light. Such emission routes additionally include a step where the third organic compound once traps electrons and a subsequent step of electron transfer among the second organic compounds and therefore provide another effect of providing a longer long-persistent luminescence time.

Next, a long-persistent luminescent material (a first organic compound and a second organic compound) and a third organic compound that the long-persistent luminescent composition contains, and other optional components that may be added to the composition are described below.

[Long-Persistent Luminescent Material]

The long-persistent luminescent material that the long-persistent luminescent composition of the invention contains a first organic compound and a second organic compound, and may be composed of a first organic compound and a second organic compound alone.

Not specifically limited, the emission wavelength of the long-persistent luminescent material is preferably 200 to 2000 nm. For example, the emission wavelength may be selected from a wavelength region of 400 nm or more, 600 nm or more, 800 nm or more, 1000 nm or more, or 1200 nm or more, and may be selected from a region of 1500 nm or less, 1100 nm or less, 900 nm or less, 700 nm or less, or 500 nm or less.

In the following, the second organic compound and the first organic compound that constitute the long-persistent luminescent material are described.

(First Organic Compound)

The first organic compound that constitutes the long-persistent luminescent material can realize long-persistent luminescence emission in cooperation with a second organic compound, and is preferably an electron-donating compound. Here, an electron-donating compound means a compound that can readily release an electron to a second organic compound. With that, preferably, the first organic compound forms an exciplex with a second organic compound to emit light. Also preferably, the first organic compound is stable in a radical cation state, and emits long-persistent luminescence at 10 K (and preferably also at 20° C.) when constituting a long-persistent luminescent material as combined with a second organic compound. Accordingly, a long-persistent luminescent composition having a longer emission lifetime can be provided.

Preferably, the HOMO of the first organic compound is higher than the HOMO of the second organic compound, and the LUMO thereof is higher than the LUMO of the second organic compound. Accordingly, electron transfer from the HOMO of the first organic compound to the HOMO or the LUMO of the second organic compound can readily occur to effectively form a charge separation state. Specifically, the HOMO of the first organic compound is preferably −3.5 to −8.0 eV, more preferably −4.0 to −7.0 eV, further preferably −4.5 to −6.0 eV.

The HOMO of the first organic compound can be measured by photoelectron spectroscopy or cyclic voltammetry, and the LUMO can be determined by cyclic voltammetry or from the absorption spectrum.

In view of the stability of the radical cation, as the first organic compound, a compound having an electron-donating group is preferably used, a compound having a conjugated system with an electron-donating group is more preferably used, and a compound having a dialkylamino group and an aromatic ring is even more preferably used. Also preferably, the first organic compound does not contain a rare earth atom and a metal atom, and is more preferably composed of atoms alone selected from carbon, hydrogen, nitrogen, oxygen, sulfur and phosphorus.

When the first organic compound is a compound having a dialkylamino group and an aromatic ring, the aromatic ring may be an aromatic hydrocarbon or an aromatic heterocycle but is preferably an aromatic hydrocarbon. The explanation and the preferable scope of the aromatic ring constituting the arylene group in the case where $Ar^{15}$ and $Ar^{16}$ are each a substituted or unsubstituted arylene group below can be referred to for the explanation and a preferable scope of the aromatic hydrocarbon here. The explanation and the preferable scope of the heterocycle constituting the heteroarylene group in the case where $Ar^{15}$ and $Ar^{16}$ are each a substituted or unsubstituted heteroarylene group below can be referred to for the explanation and a preferable scope of the aromatic heterocycle here. Of the examples, the aromatic ring is preferably a benzene ring or a biphenyl ring, more preferably a biphenyl ring. The aromatic ring may have a substituent. The specific examples and the preferable scope of the substituents which the arylene group and the like of $Ar^{15}$ and $Ar^{16}$ below may have can be referred to for specific examples and a preferable scope of the substituent which the aromatic ring may have. The dialkylamino group is preferably substituted to the aromatic ring. The number of the dialkylamino groups contained in the first organic compound may be one, two or more but is preferably one to four, more preferably two or four, further preferably two. The explanation, the preferable scope and the specific examples of the alkyl group of $R^{21}$ and the like below can be referred to for the explanation, a preferable scope and specific examples of the alkyl groups of the dialkylamino group. The alkyl groups of the dialkylamino group may have a substituent. The explanation and the preferable scope of the substituent which the alkyl group of $R^{21}$ and the like may have can be referred to for the explanation and a preferable scope of the substituent.

The first organic compound is preferably a compound represented by the following general formula (1).

General Formula (1)

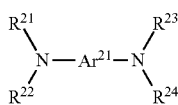

In the general formula (1), $Ar^{21}$ represents a substituted or unsubstituted arylene group. The explanation and the preferable scope of the aromatic ring constituting the arylene group and the specific examples of the arylene group in the case where $Ar^{15}$ and $Ar^{16}$ are each a substituted or unsubstituted arylene group below can be referred to for the explanation and a preferable scope of the aromatic ring constituting the arylene group of $Ar^{21}$ and for specific examples of the arylene group. $Ar^{21}$ is preferably a substituted or unsubstituted phenylene group or a substituted or unsubstituted biphenyldiyl group, more preferably a substituted or unsubstituted biphenyldiyl group. The specific examples and the preferable scope of the substituents which the arylene group and the like of $Ar^{15}$ and $Ar^{16}$ below may have can be referred to for specific examples and a preferable scope of the substituent which the arylene group here may have.

$R^{21}$ to $R^{24}$ each independently represent a substituted or unsubstituted alkyl group. $R^{21}$ to $R^{24}$ may be the same or different from each other. The alkyl group of $R^{21}$ to $R^{24}$ may be any of linear, branched and cyclic groups. The number of the carbon atoms is preferably 1 to 20, more preferably 1 to 10, further preferably 1 to 6. Examples include methyl group, ethyl group, n-propyl group, isopropyl group and the like. Examples of the substituent which the alkyl group may have include an aryl group having 6 to 40 carbon atoms, a heteroaryl group having 3 to 40 carbon atoms, an alkenyl group having 2 to 10 carbon atoms, an alkynyl group having 2 to 10 carbon atoms and the like. These substituents may further have a substituent.

Preferable compounds which can be used as the first organic compound are shown below. In this regard, however, the first organic compounds which can be used in the invention should not be construed as being limited by these specific examples.

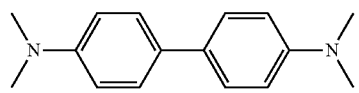

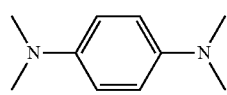

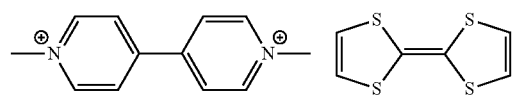

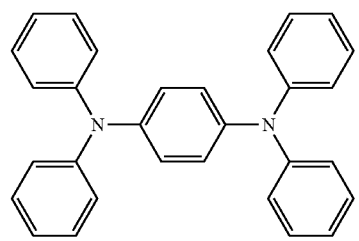

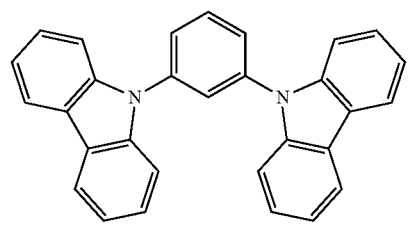

-continued

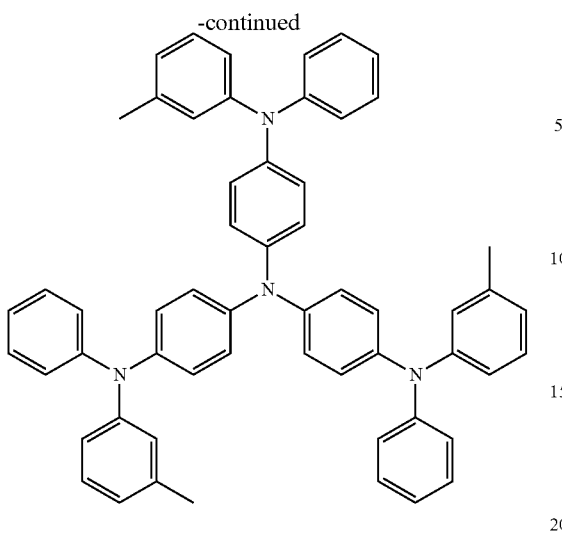

The first organic compound used in the invention may be a polymer obtained by introducing a polymerizable group to the first organic compound as a single element and polymerizing it as a monomer. A specific example of the polymer which can be used as the first organic compound is a polymer having the following structure. In the following formula, n is an integer of one or larger. In this regard, however, the polymers which can be used as the first organic compound in the invention should not be construed as being limited by the specific example.

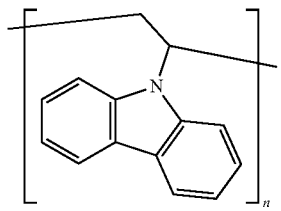

(Content of First Organic Compound)

The first organic compound content of the long-persistent luminescent material, based on the total amount by mole of the first organic compound and the second organic compound, is preferably less than 60 mol %, more preferably less than 30 mol %, further preferably less than 20 mol %, still further preferably less than 10 mol %. The first organic compound content of the long-persistent luminescent material, based on the total amount by mole of the first organic compound and the second organic compound, is preferably more than 0.001 mol %, more preferably more than 0.01 mol %, further preferably more than 1 mol %. By changing the first organic compound content, the color of the light emitted by the long-persistent luminescent composition can be controlled. For example, a higher first organic compound content shows a tendency towards an increased rate of exciplex formation and luminescence of a long wavelength. Using this tendency, the color of the light emitted by the long-persistent luminescent composition and the emission duration time can be controlled. For example, in the case of a long-persistent luminescent material composed of the following second organic compound (left side) and the first organic compound (right side), blue light can be observed when the first organic compound content is less than 30 mol %, and yellow light is observed when the first organic compound content is more than 30 mol %.

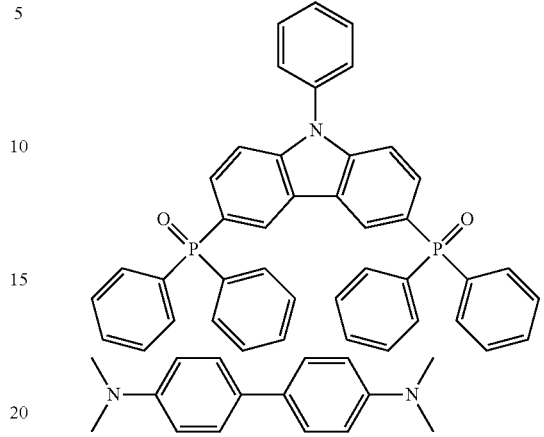

(Second Organic Compound)

The second organic compound constituting the long-persistent luminescent material of the invention realizes long-persistent luminescence emission in cooperation with the first organic compound, and is preferably an electron accepting compound. Here, an electron accepting compound means a compound that can readily receive an electron from the first organic compound. With that, preferably, the second organic compound forms an exciplex with the first organic compound to emit light. Also preferably, the second organic compound is stable in a radical anion state, and emits long-persistent luminescence at 10 K (and preferably also at 20° C.) when constituting a long-persistent luminescent material as combined with the first organic compound. Accordingly, a long-persistent luminescent composition having a longer emission lifetime can be provided.

The gap between the HOMO and the LUMO of the second organic compound is preferably 1.0 to 3.5 eV, more preferably 1.5 to 3.4 eV, further preferably 2.0 to 3.3 eV. With the gap, an electron can be transferred from the HOMO to the LUMO efficiently upon application of light to the long-persistent luminescent composition. The LUMO of the second organic compound is preferably 6.0 eV or less, more preferably 5.5 eV or less, further preferably 5.0 eV or less. With the LUMO, an electron moves easily from the LUMO to the LUMO of the second organic compounds after a charge-separated state is generated, and the recombination with a hole can be thereby caused with a high probability.

The HOMO of the second organic compound can be measured by photoelectron spectroscopy or cyclic voltammetry, and the LUMO can be determined by cyclic voltammetry or from the absorption spectrum.

The second organic compound preferably has a high glass transition temperature Tg so that the molecules can exist in the glass state at room temperature, and the second organic compound is preferably a compound from which a high film density can be obtained when a film is formed. When the density of the second organic compound in a film is high, an electron is easily diffused from the LUMO to the LUMO of the second organic compound after a charge-separated state is generated, and the recombination of an electron and a hole can be thereby caused with a high probability.

In view of the stability of the radical anion, as the second organic compound, a compound having an atom with a high electronegativity and an electron-withdrawing group is preferably used, and a compound having an atom with a high electronegativity and a conjugated system with an electron-withdrawing group is more preferably used. Also preferably, the second organic compound does not contain a rare earth atom and a metal atom, and is more preferably composed of atoms alone selected from carbon, hydrogen, nitrogen, oxygen, sulfur and phosphorus.

A preferable example of the second organic compound is a compound containing one phosphine oxide structure $R_3P(=O)$ (wherein each R represents a substituent, and the three R's may be the same or different from each other) or more, and a further preferable example is a compound containing one phosphine oxide structure $R_3P(=O)$ or more and one hetero atom or more. The hetero atom may be N, O, S, P and the like. Only one kind thereof may be contained, or two or more kinds thereof may be contained. The number of the phosphine oxide structures contained in the second organic compound is preferably two or more, and in this case, the phosphine oxide structures may be the same or different from each other. At least one of the substituents R's of one of the phosphine oxide structures is preferably linked to a substituent R of another phosphine oxide structure through a hetero atom, and it is more preferable that at least one of the substituents R's is linked to a substituent R of another phosphine oxide structure through a hetero atom and that atoms which are not the atoms of the linked substituents R's bound to the hetero atom are linked to each other through a single bond.

The substituents R's of the phosphine oxide structures are each preferably a substituted or unsubstituted aryl group or a substituted or unsubstituted heteroaryl group. The explanation and the preferable scope of the aromatic ring constituting the aryl group and the specific examples of the aryl group in the case where $Ar^{11}$ and the like are each a substituted or unsubstituted aryl group below can be referred to for the explanation and a preferable scope of the aromatic ring constituting the aryl group here and for specific examples of the aryl group. The explanation and the preferable scope of the heterocycle constituting the heteroaryl group and the specific examples of the heteroaryl group in the case where $Ar^{11}$ and the like are each a substituted or unsubstituted heteroaryl group below can be referred to for the explanation and a preferable scope of the heterocycle constituting the heteroaryl group here and for specific examples of the heteroaryl group. The specific examples and the preferable scope of the substituents which the aryl group and the heteroaryl group of $Ar^{11}$ and the like may have can be referred to for specific examples and a preferable scope of the substituents which the aryl group and the heteroaryl group here may have.

The second organic compound is preferably a compound represented by the following general formula (2).

General Formula (2)

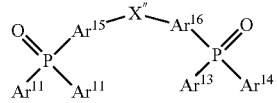

In the general formula (2), $Ar^{11}$ to $Ar^{14}$ each independently represent a substituted or unsubstituted aryl group or a substituted or unsubstituted heteroaryl group and are preferably a substituted or unsubstituted aryl group. $Ar^{11}$ to $Ar^{14}$ may be the same or different from each other. $Ar^{15}$ and $Ar^{16}$ each independently represent a substituted or unsubstituted arylene group or a substituted or unsubstituted heteroarylene group, and $Ar^{15}$ and $Ar^{16}$ may be linked to each other through a single bond and form a condensed ring structure. $Ar^{15}$ and $Ar^{16}$ may be the same or different from each other. $Ar^{15}$ and $Ar^{16}$ are preferably substituted or unsubstituted arylene groups, and it is more preferable that the arylene groups are linked to each other through a single bond and form a condensed ring structure.

The aromatic ring constituting the aryl group in the case where $Ar^{11}$ to $Ar^{14}$ are each a substituted or unsubstituted aryl group and the aromatic ring constituting the arylene group in the case where $Ar^{15}$ and $Ar^{16}$ are each a substituted or unsubstituted arylene group may be each a monocyclic ring, a condensed ring formed by condensation of two or more aromatic rings or linked rings formed by two or more linked aromatic rings. When two or more aromatic rings are linked, the rings may be linked linearly or linked in a branch structure. The number of the carbon atoms of the aromatic ring constituting the aryl group or the arylene group is preferably 6 to 40, more preferably 6 to 22, further preferably 6 to 18, still further preferably 6 to 14, particularly preferably 6 to 10. Specific examples of the aryl group include phenyl group, naphthalenyl group and biphenyl group. Specific examples of the arylene group include phenylene group, naphthalenediyl group and biphenyldiyl group. Of these examples, a substituted or unsubstituted phenyl group is particularly preferable as $Ar^{11}$ to $Ar^{14}$. A substituted or unsubstituted phenylene group is particularly preferable as $Ar^{15}$ and $Ar^{16}$, and it is particularly preferable that the phenylene groups are linked to each other through a single bond and form a tricyclic structure (a tricyclic structure of a benzene ring, a five-membered ring including $X^{11}$ and a benzene ring).

The heterocycle constituting the heteroaryl group in the case where $Ar^{11}$ to $Ar^{14}$ are each a substituted or unsubstituted heteroaryl group and the heterocycle constituting the heteroarylene group in the case where $Ar^{15}$ and $Ar^{16}$ are each a substituted or unsubstituted heteroarylene group may be each a monocyclic ring, a condensed ring formed by one heterocycle or more condensed with an aromatic ring or with a heterocycle or linked rings formed by one heterocycle or more linked to an aromatic ring or to a heterocycle. The number of the carbon atoms of the heterocycle constituting the heteroaryl group is preferably 3 to 40, more preferably 5 to 22, further preferably 5 to 18, still further preferably 5 to 14, particularly preferably 5 to 10. The hetero atom constituting the heterocycle is preferably nitrogen atom. Specific examples of the heterocycle include pyridine ring, pyridazine ring, pyrimidine ring, triazole ring and benzotriazole ring.

Examples of the substituents which the aryl group and the heteroaryl group of $Ar^{11}$ to $Ar^{14}$ may have and the substituents which the arylene group and the heteroarylene group of $Ar^{15}$ and $Ar^{16}$ may have include hydroxy group, a halogen atom, an alkyl group having 1 to 20 carbon atoms, an alkoxy group having 1 to 20 carbon atoms, an alkylthio group having 1 to 20 carbon atoms, an alkyl-substituted amino group having 1 to 20 carbon atoms, an aryl-substituted amino group having 1 to 20 carbon atoms, an aryl group having 6 to 40 carbon atoms, a heteroaryl group having 3 to 40 carbon atoms, an alkenyl group having 2 to 10 carbon atoms, an alkynyl group having 2 to 10 carbon atoms, an alkylamide group having 2 to 20 carbon atoms, an arylamide group having 7 to 21 carbon atoms, a trialkylsilyl group having 3 to 20 carbon atoms and the like. Of these specific examples, those which can further have a substituent may be substituted. More preferable substituents are an alkyl group having 1 to 20 carbon atoms, an alkoxy group having 1 to 20 carbon atoms, an alkylthio group having 1 to 20 carbon atoms, an alkyl-substituted amino group having 1 to 20 carbon atoms, an aryl-substituted amino group having 1 to 20 carbon atoms, an aryl group having 6 to 40 carbon atoms and a heteroaryl group having 3 to 40 carbon atoms.

$X^{11}$ represents $NR^{11}$, O or S, and $R^{11}$ represents a hydrogen atom or a substituent. Examples of the substituent which $R^{11}$ may represent include an alkyl group having 1 to 20 carbon atoms, an aryl group having 6 to 40 carbon atoms, a heteroaryl group having 3 to 40 carbon atoms, an alkenyl group having 2 to 10 carbon atoms, an alkynyl group having 2 to 10 carbon atoms and the like. These substituents may further have a substituent. $R^{11}$ is preferably a hydrogen atom or a substituted or unsubstituted aryl group, more preferably a substituted or unsubstituted aryl group, further preferably a substituted or unsubstituted phenyl group.

Preferred compounds for use as the second organic compound are shown below. However, the second organic compound usable in the invention should not be limitatively interpreted by these specific examples.

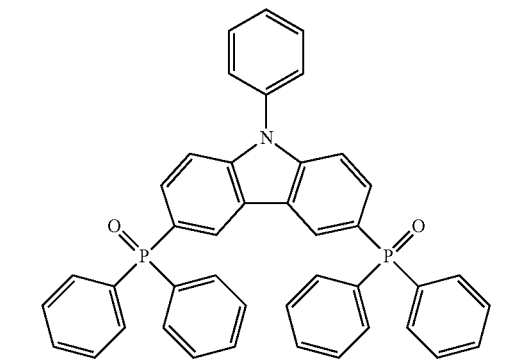

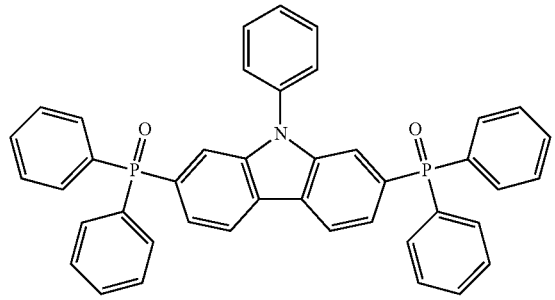

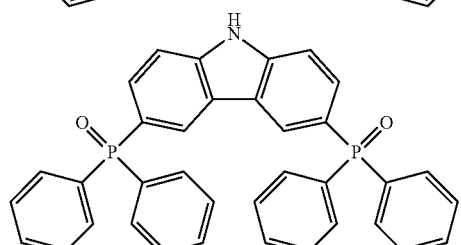

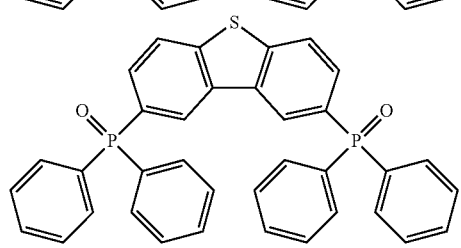

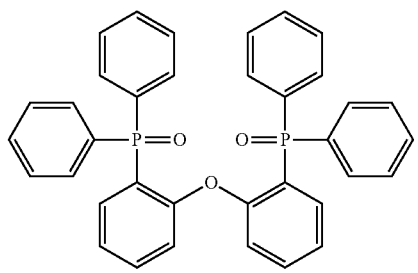

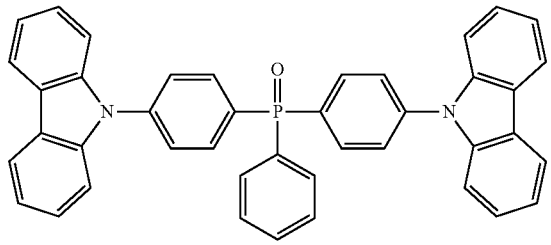

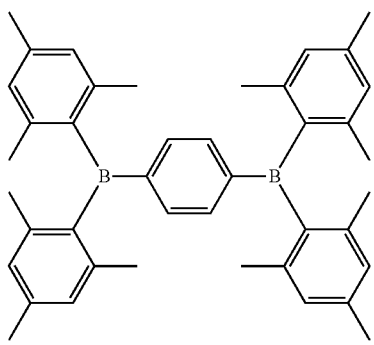

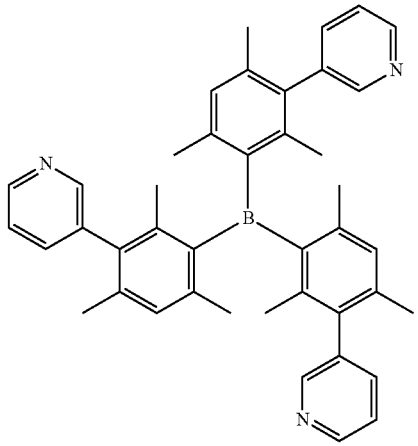

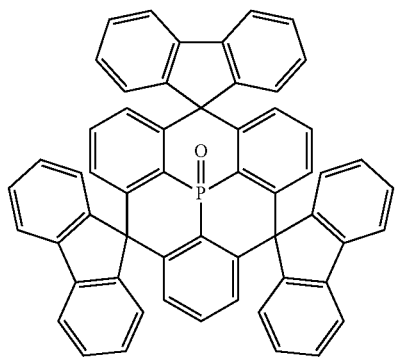

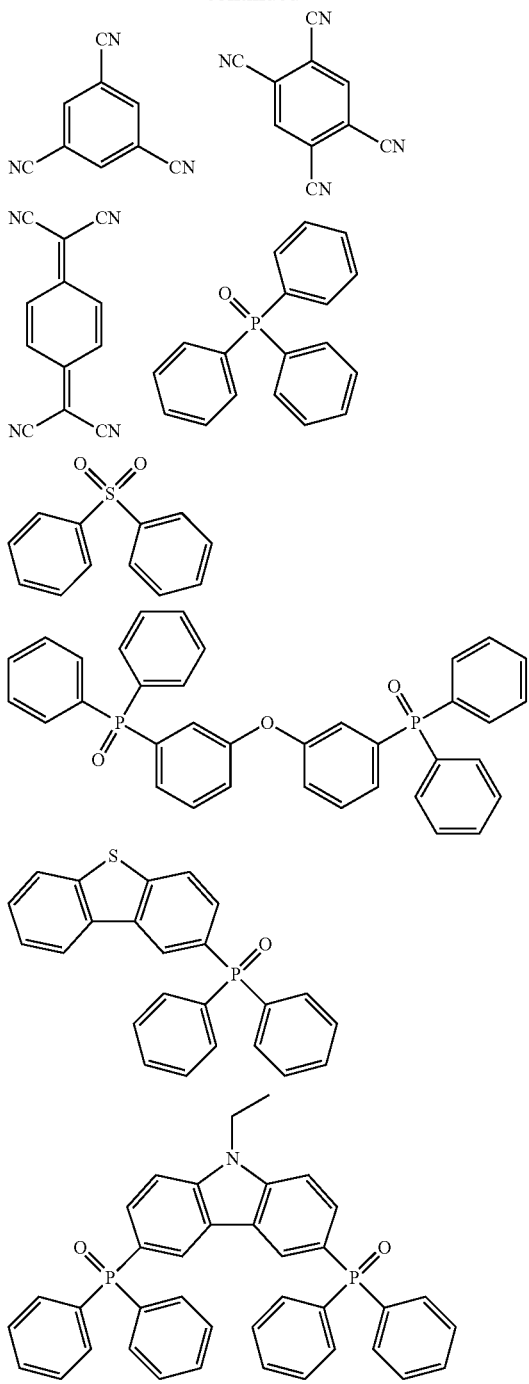
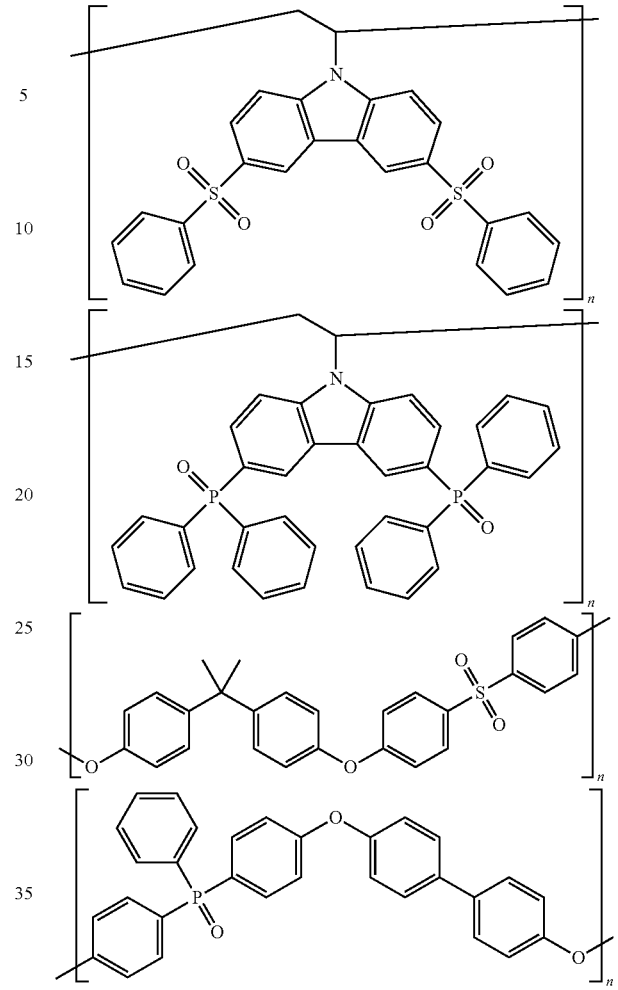

The second organic compound used in the invention may be a polymer obtained by introducing a polymerizable group to the second organic compound as a single element and polymerizing it as a monomer. A specific example of the polymer which can be used as the second organic compound is a polymer having the following structure. In the following formula, n is an integer of one or larger. In this regard, however, the polymers which can be used as the second organic compound in the invention should not be construed as being limited by the specific example.

[Third Organic Compound]

The third organic compound for use in the long-persistent luminescent composition of the invention is preferably a light-emitting material. The emission wavelength of the third organic compound can be selected from, for example, a visible region or a near-infrared region. Specifically, the emission wavelength of the third organic compound is preferably 200 to 2000 nm. For example, the emission wavelength may be selected from a wavelength region of 400 nm or more, 600 nm or more, 800 nm or more, 1000 nm or more, or 1200 nm or more, and may be selected from a region of 1500 nm or less, 1100 nm or less, 900 nm or less, 700 nm or less, or 500 nm or less. Also preferably, the third organic compound has a carrier-trapping function.

The third organic compound may be any of a fluorescent material, a phosphorescent material or a delayed fluorescent material, and may be selected from any known ones in accordance with the intended emission color. Here, "fluorescent material" is a light-emitting material whose emission intensity of fluorescence is higher than the emission intensity of phosphorescence thereof at room temperature; "phosphorescent material" is a light-emitting material whose emission intensity of phosphorescence is higher than the emission intensity of fluorescence thereof at room temperature; and "delayed fluorescent material" is a light-emitting material that emits both fluorescence having a short emission lifetime and fluorescence having a long emission lifetime (delayed fluorescence) at room temperature. General fluorescence (fluorescence other than delayed fluorescence) has an emission lifetime on an ns order, and phosphorescence generally has an emission lifetime on an ms order, and accordingly, fluorescence and phosphorescence can be differentiated from each other in point of the emission lifetime thereof. A light-emitting organic compound other than organic metal complexes is a general fluorescent material or a delayed fluorescent material.

For example, as a fluorescent material, TTPA (green light-emitting material), TBRb (orange light-emitting material) and DCM2 (red light-emitting material) used in Examples given hereinunder are preferably used. As a phosphorescent material, Ir(ppy)$_3$, Ir(piq)$_3$, Ir(btp)$_2$(acac), and PtOEP used in Examples are preferably used.

The third organic compound content of the long-persistent luminescent composition is, based on the total amount by mole of the first organic compound, the second organic compound and the third organic compound, preferably less than 50 mol %, more preferably less than 25 mol %, even more preferably 0.001 to 20 mol %, and further more preferably 0.001 to 10 mol %. By changing the third organic compound content of the long-persistent luminescent composition, the emission wavelength of the long-persistent luminescent composition can be controlled. For example, of the long-persistent luminescent composition using a third organic compound having a negative value of $E_{S1}(B)-E_{S1}(A)$, a higher third organic compound content shows a tendency towards a longer emission wavelength and the long-persistent luminescent composition of the type can emit light falling in a near IR region.

[Other Components]

The long-persistent luminescent composition may be composed only of the first organic compound, the second organic compound and the third organic compound but may contain any other component or a solvent for dissolving the components of the long-persistent luminescent composition. Examples of the other component include carrier-trapping materials. When a carrier-trapping material is added, electrons move from the radical cations of the second organic compound generated by charge separation to the carrier-trapping material, and electrons can be accumulated more stably in the carrier-trapping material. The electrons accumulated in the carrier-trapping material again return to the second organic compound by energy such as heat, then move to the third organic compound and recombine with holes of the first organic compound to give long-persistent emission.

The carrier-trapping material is preferably a material having a LUMO level that is close to the LUMO level of the second organic compound. The LUMO level of the carrier-trapping material is preferably lower than the LUMO level of the second organic material by 0.001 eV or more, more preferably by 0.01 eV or more, further preferably by 0.1 eV or more. The difference between the LUMO level of the carrier-trapping material and the LUMO level of the second organic compound is preferably 0.5 eV or less, more preferably 0.4 eV or less, further preferably 0.3 eV or less.

(Embodiments of Luminescence)

When light is applied, the long-persistent luminescent composition of the invention continues to exhibit luminescence for a long time even after the photo-irradiation has stopped (long-persistent luminescence).

The luminescence from the long-persistent luminescent composition includes luminescence from the long-persistent luminescent material and the third organic compound. The luminescence from the long-persistent luminescent material is preferably such that the first organic compound and the second organic compound, both after excited, associate (aggregate) to form an exciplex and the exciplex emits light by radiative relaxation (exciplex luminescence). In the case where the long-persistent luminescent material forms an exciplex and emits light, the luminescence from the long-persistent luminescent material may be exciplex luminescence alone, or may include luminescence from the first organic compound not associated with the second organic compound or luminescence from the second organic compound not associated with the first organic compound. The light to be emitted may be any one of fluorescence or phosphorescence, or may be both of fluorescence and phosphorescence, or may even include delayed fluorescence.

The excitation light for obtaining long-persistent luminescence from the long-persistent luminescent composition may be sunlight, or may be light from an artificial light source that may emit a light falling within a specific wavelength range.

The photo-irradiation time for obtaining persistent luminescence from the long-persistent luminescent composition is preferably one microsecond or longer, more preferably one millisecond or longer, further preferably one second or longer, still further preferably 10 seconds or longer. With the photo-irradiation time, radical anions and radical cations can be generated sufficiently, and luminescence continues for a long time after the photo-irradiation has stopped.

The emission wavelength of the long-persistent luminescent composition can be controlled widely depending on the combination of the first organic compound to the third organic compound and is therefore not particularly limited, but is preferably 200 to 2500 nm. The emission wavelength of the long-persistent luminescent composition is also preferably within a visible region of 380 to 750 nm, or a near IR region of 700 to 2500 nm. Light falling within a near IR region has a high biopermeability and therefore can be used for visualization and medical check for deep parts of living bodies, and can be applied to various fields of biological and medical technologies and communication technologies with little light loss.

[Forms of Long-Persistent Luminescent Composition]

The form of the long-persistent luminescent composition of the invention is not particularly limited as long as the long-persistent luminescent composition contains the first organic compound, the second organic compound and the third organic compound. Therefore, a blend of the first organic compound, the second organic compound and the third organic compound may be used, or a composition in which the second organic compound and the first organic compound constituting the long-persistent luminescent material, and the third organic compound are in separated areas may also be used. Examples of the blend of the long-persistent luminescent material and the third organic compound include a solution obtained by dissolving the long-persistent luminescent material and the third organic compound in a solvent and a thin film containing the long-persistent luminescent material and the third organic compound (a long-persistent luminescent film). Examples of the composition in which the second organic compound, the first organic compound and the third organic compound are in separated areas include one having an area where the amount by weight of the first organic compound is 100 times or more higher than that of the second organic compound and the third organic compound, an area where the amount by weight of the second organic compound is 100 times or more higher than that of the first organic compound and the third organic compound, and an area where the amount by weight of the third organic compound is 100 times or more higher than that of the first organic compound and the second organic compound, one having an area which does not contain the second organic compound and the third organic compound but contains the first organic compound, an area which does not contain the first organic compound and the third organic compound but contains the second organic compound, and an area which does not contain the first organic compound and the second organic compound but contains the third organic compound, one where these three areas are adjacent to each other, and one where those areas are layered (including a thin film).

A thin film using the long-persistent luminescent material and the third organic compound may be formed by a dry process or a wet process. For example, the thin film may be a thin film in the glass state obtained by adding the first organic compound and the third organic compound to a heat melted liquid of the second organic compound, blending them and cooling the blend. The solvent for use in forming the film by a wet process may be an organic solvent having a compatibility with the solutes, that is, the first organic compound, the second organic compound and the third organic compound. Using an organic solvent, for example, it is possible to prepare a blend solution of the second organic compound, the first organic compound and the third organic compound, prepare a solution by dissolving second organic compound only, prepare a solution by dissolving the first organic compound only, or prepare a solution by dissolving the third organic compound only. When the blend solution is applied on a support and dried, a blend thin film of first organic compound, the second organic compound and the third organic compound can be formed. When the solution of the first organic compound, the solution of the second organic compound and the solution of the third organic compound are applied one by one on a support and dried, a thin film of the first organic compound, a thin film of the second organic compound and a thin film of the third organic compound can also be formed in a manner that the films are in contact with each other (the solution of the first organic compound, the solution of the second organic compound and the solution of the third organic compound may be applied in any order).

The plane shape of the thin film can be determined appropriately according to the intended use and may be, for example, a polygon such as squares and rectangles, a continuous shape such as circles, ellipses, ovals and semicircles or a specific pattern corresponding to a geometric pattern, a letter, a figure or the like.

[Long-Persistent Luminescent Device]

The long-persistent luminescent device of the invention has the long-persistent luminescent composition of the invention on a support. The long-persistent luminescent composition is generally formed in a film shape on the support. The film formed on the support may be a single-layer film or a multi-layer film. The single-layer film or a part of the layers of the multi-layer film can be a film containing two or more of the first organic compound, the second organic compound and the third organic compound. Moreover, a part of the layers of the multi-layer film can be a film which contains the second organic compound but does not contain the first organic compound and the third organic compound, and a part of the layers can be a film which contains the first organic compound but does not contain the second organic compound and the third organic compound, and further a part of the layers can be a film which contains the third organic compound but does not contain the first organic compound and the second organic compound. Here, the three kinds of layers can be arranged in a manner that they are in contact with each other.

The corresponding descriptions in the section of the long-persistent luminescent composition can be referred to for the long-persistent luminescent composition here. The descriptions of the thin film in the section of the forms of the long-persistent luminescent composition can be referred to for the forms of the long-persistent luminescent film.

The support is not particularly limited and may be any support which is usually used for long-persistent luminescent materials. Examples of the material of the support include paper, metals, plastic, glass, quartz, silicon and the like. Because the film can be formed also on a flexible support, various shapes can be obtained according to the application.

The long-persistent luminescent film is preferably entirely covered with a sealant. As the sealant, a transparent material which has low water or oxygen permeability, such as glass or epoxy resins, can be used.

According to the invention, a transparent long-persistent luminescent composition can be provided. Accordingly, unlike the conventional inorganic materials, the long-persistent luminescent composition can be used and applied for various applications. For example, when the transparent long-persistent luminescent composition of the invention is sandwiched between two supports made of a transparent material such as glass, a transparent long-persistent luminescent plate and the like can be formed. When the transparency of the supports is controlled, a semitransparent long-persistent luminescent plate can be also obtained. Moreover, according to the invention, by laminating transparent long-persistent luminescent films which emit light of different colors, the color of the light emitted to outside can be adjusted.

[Use of Long-Persistent Luminescent Composition]

The long-persistent luminescent composition of the invention is characterized by easy emission wavelength control, and can constitute a long-persistent luminescent product simply by blending, for example, the first organic compound, the second organic compound and the third organic compound as organic compounds in a solvent and applying the blend as mentioned above. Therefore, while inorganic long-persistent luminescent materials constitute a long-persistent luminescent product through steps of firing of the inorganic materials containing rare elements at a high temperature, formation into fine particles and dispersion, the long-persistent luminescent composition of the invention has the following advantages over the inorganic long-persistent luminescent materials: preparation of the materials is easy; the production costs of the long-persistent luminescent product can be kept low; and transparency, flexibility and softness can be given to the long-persistent luminescent product. Thus, the long-persistent luminescent composition of the invention can achieve entirely new applications, in addition to the use as a general long-persistent luminescent product, making use of the characteristics.

For example, by appropriately selecting the third organic compound to be combined with the first organic compound and the second organic compound, the long-persistent luminescent composition of the invention can emit light with a specific wavelength in a broad wavelength region ranging from blue light to near infrared rays. The luminous flux of the light emitted from a long-persistent luminescent composition which emits green light is strong in the green region, and thus the composition can be used effectively as a long-persistent luminescent paint for signs. A long-persistent luminescent composition which emits light in the red to near infrared region is useful as a labeling material used for bioimaging because light in the wavelength region easily penetrates a living body. Moreover, using a combination of long-persistent luminescent compositions emitting light of various colors, articles with excellent designs can be provided, and the compositions can be applied to a system for preventing official document forgery of passports and the like.

A long-persistent luminescent paint which can be excellently applied can be obtained by dissolving the long-persistent luminescent composition of the invention in a solvent. When such a long-persistent luminescent paint is applied on the entire surfaces of roads or interior surfaces of buildings, large-scale long-persistent luminescent lighting which does not require any power source can be obtained. When edge lines of roads are drawn with the long-persistent luminescent paint, the edge lines can be recognized also in the dark, and the safety of traffics can be improved significantly.

Moreover, when safety guidance signs drawn with the long-persistent luminescent paint are used, safe escape guidance can be achieved for a long time during a disaster. An escape system for a disaster can be constructed by coating energy-saving lights, housing materials, railroads, mobile devices or the like with the long-persistent luminescent paint.

A long-persistent luminescent paint containing the long-persistent luminescent composition of the invention can also be used as printing ink. As a result, prints with excellent designs which can be used also for guidance in the dark or during a disaster can be obtained. Such ink for long-persistent luminescent printing can be preferably used, for example, for printing for covers, packages, posters, POP, stickers, signboards, escape guidance signs, safety goods and crime prevention goods.

A long-persistent luminescent molded article can be produced using a long-persistent luminescent composition in which at least any of the first organic compound, the second organic compound and the third organic compound is a polymer (a long-persistent luminescent polymer) or using a composition produced by adding a commercial semiconducting polymer to the long-persistent luminescent composition of the invention.

Examples of such a long-persistent luminescent molded article include lighted signs, product displays, liquid crystal back lights, lighting displays, covers for lighting fixtures, traffic signs, safety signs, parts for improving night visibility, signboards, screens, automobile parts such as reflecting plates and meter parts, equipment and toys in amusement facilities and mobile devices such as laptops and mobile phones, as well as sign buttons in automobiles or buildings, watch and clock dials, accessories, stationery products, sports goods, housings, switches and buttons in the field of various electric, electronic and OA devices and the like.

Because the transparency of the long-persistent luminescent composition of the invention is excellent, a window for lighting control having the long-persistent luminescence properties can be obtained by coating a surface of glass with the long-persistent luminescent composition or forming a thin plate with a blend of the long-persistent luminescent composition and a resin. Moreover, when a thin plate made of the long-persistent luminescent composition and a reflecting plate are laminated, a long-persistent luminescent plate with high brightness can be obtained. Such a long-persistent luminescent plate can be used as a luminescent guiding tile for parts for evacuation routes for disasters, plates for stairs, risers, frame materials, ditch cover materials, parts for open parking lots, maintenance parts for harbors, safety parts for road facilities, scaffold parts for works at high places, scaffold parts for facilities floating in the sea, parts related to trails in mountains, salt damage resistant weather resistant signboards and the like.

By coating fibers with the long-persistent luminescent composition of the invention, long-persistent luminescent fibers, fabrics using the fibers and long-persistent luminescent clothes can be obtained. Such long-persistent luminescent fiber products include workwear for night, hats, carpets for emergency paths, bridal clothes, tapestries, interior materials for cars and the like.

In addition, the long-persistent luminescent composition of the invention can constitute various materials such as long-persistent luminescent films, long-persistent luminescent tapes, long-persistent luminescent stickers, long-persistent luminescent building materials and long-persistent luminescent sprays. In all the cases, because emission wavelength control is easy and each component can be composed of an organic compound, there is a wide choice of colors, and transparency and softness can be given to the materials. Thus, the designs, the properties as signs and the handleability can be made excellent. For example, long-persistent luminescent films can be widely used as packaging materials of escape guidance and emergency supplies.

Further, in the long-persistent luminescent composition of the invention, the charge-separated state of the long-persistent luminescent material tends to last relatively long. Thus, the long-persistent luminescent composition can be used for various applications in a wide variety of fields. For example, the long-persistent luminescent composition of the invention can be applied to the field of artificial photosynthesis in which a charge-separated state is generated by light energy, leading to the production of a substance. Moreover, the long-persistent luminescent composition of the invention can be used effectively as devices responding to thermal energy or mechanical energy. An example of the device responding to thermal energy is thermal switching in which the long-persistent luminescent material is brought into the charge-separated state by applying excitation light and then caused to emit light momentarily by heating the long-persistent luminescent composition. Examples of a device responding to mechanical energy include a device which emits light when mechanical energy such as pressure is applied to the long-persistent luminescent composition in which the long-persistent luminescent material has been made to be in the charge-separated state, and a device whose luminescence state changes when mechanical energy such as pressure is applied to the long-persistent luminescent composition in which the long-persistent luminescent material has been made to be in the charge-separated state. Application examples thereof include an interactive emission art that responds to external stimuli such as heat.

EXAMPLES

The characteristics of the invention are explained more specifically below using Examples. The materials, the contents of the treatment, the treatment procedures and the like shown below can be appropriately modified as long as the modifications do not depart from the purposes of the invention. Thus, the scope of the invention should not be construed as being limited by the specific examples shown below. For the excitation light, a 340-nm LED light (M340L4, available from Thorlabs Japan Inc.) was used. The photoluminescence spectra, the long-persistent luminescence spectra and the emission lifetime, and the photoluminescence quantum yield were measured using a spectrometer (FLUOROMAX, manufactured by HORIBA Jobin Yvon; PMA-12, manufactured by Hamamatsu Photonics K.K.), a multi-channel spectrometer (QE-Pro, manufactured by Ocean Optics, Inc.), a multimeter (34461A, manufactured by Keysight Technologies), and a PL quantum yield measuring apparatus (Quantaurus-QY, manufactured by Hamamatsu Photonics K.K.).

The lowest excited singlet energy level ($E_{S1}$) and the lowest excited triplet energy level ($E_{T1}$) of the compounds used in Examples and Comparative Examples were determined according to the process mentioned below.

(1) Lowest Excited Singlet Energy Level ($E_{S1}$)

A toluene solution or a chloroform solution (concentration: $10^{-5}$ mol/L) of the compound to be analyzed was prepared. An excitation light was applied to the sample at room temperature (300 K) to measure the fluorescence spectrum thereof. luminescence from immediately after application of the excitation light up to 100 nanoseconds after the light application was accumulated to give a fluorescence spectrum, for which the emission intensity was on the vertical axis and the wavelength was on the horizontal axis. For the fluorescence spectrum, the vertical axis indicates emission, and the horizontal axis indicates wavelength. A tangent line was drawn to the rising of the emission spectrum on the short wavelength side, and the wavelength value λedge [nm] at the intersection between the tangent line and the horizontal axis was read. The wavelength value was converted into an energy value according to the following conversion expression to calculate $E_{S1}$.

$E_{S1}$[eV]=1239.85/λedge    Conversion Expression:

(2) Lowest Excited Triplet Energy Level ($E_{T1}$)

The same sample as that for measurement of the lowest excited singlet energy level ($E_{S1}$) was cooled to 77 [K], and the sample for phosphorescence measurement was irradiated with an excitation light (340 nm), and using PMA-12, the phosphorescence intensity thereof was measured. The emission from 1 millisecond after irradiation with the excitation light to 10 milliseconds after irradiation therewith was accumulated to give a phosphorescence spectrum, for which the emission intensity was on the vertical axis and the wavelength was on the horizontal axis. A tangent line was drawn to the rising of the phosphorescence spectrum on the short wavelength side, and the wavelength value λedge [nm] at the intersection between the tangent line and the horizontal axis was read. The wavelength value was converted into an energy value according to the following conversion expression to calculate $E_{T1}$.

$E_{T1}$[eV]=1239.85/λedge    Conversion Expression:

The tangent line to the rising of the phosphorescence spectrum on the short wavelength side was drawn as follows. While moving on the spectral curve from the short wavelength side of the phosphorescence spectrum toward the maximum value on the shortest wavelength side among the maximum values of the spectrum, a tangent line at each point on the curve toward the long wavelength side was taken into consideration. With rising thereof (that is, with increase in the vertical axis), the inclination of the tangent line increases. The tangent line drawn at the point at which the inclination value has a maximum value was referred to as the tangent line to the rising on the short wavelength side of the phosphorescence spectrum.

Compounds Used in Examples and Comparative Examples

In Examples and Comparative Examples, TMB was used as the first organic compound, PPT, m-MTDATA or CV was used as the second organic compound, and 4CzBN, 2CzPN, Flrpic, TBPe, 4CzIPN, 5CzPN, TTPA, TBRb, DCM2, NileRed, DBP, Ir(ppy)$_3$, Ir(piq)$_3$, Ir(btp)$_2$(acac) or PtOEP was used as the third organic compound. Structures of these compounds are as shown below.

First Organic Compound

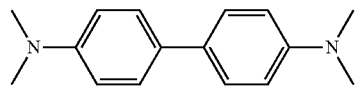

TMB

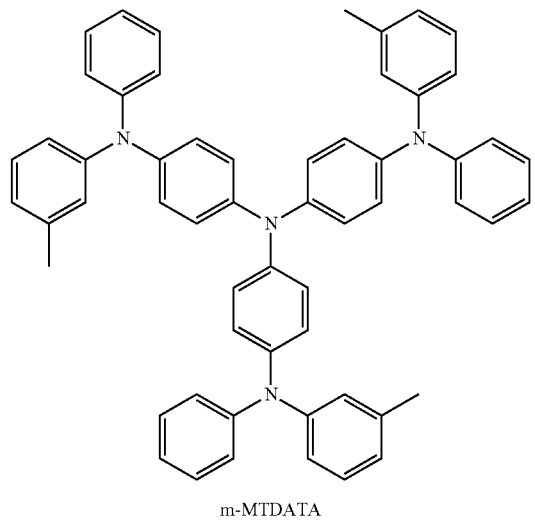

m-MTDATA

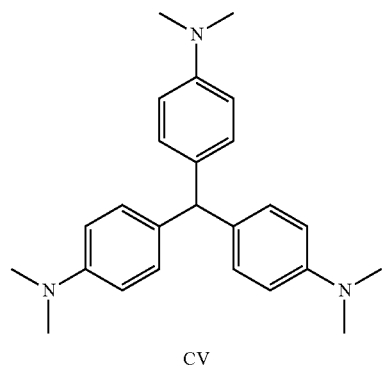

CV

Second Organic Compound

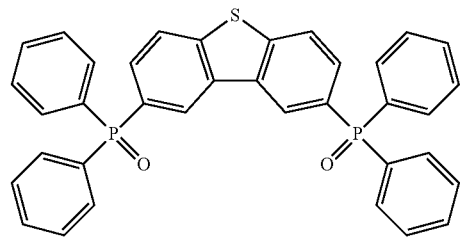

PPT

-continued
Third Organic Compound
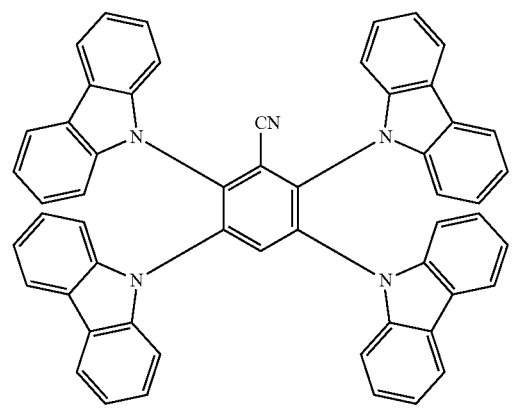
4 CzBN
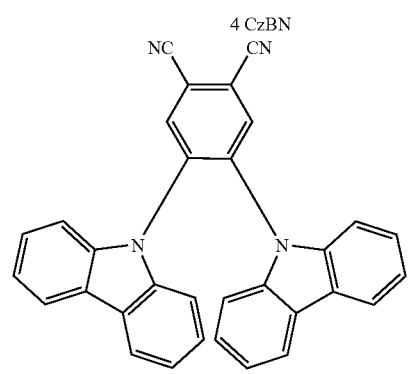
2 CzPN
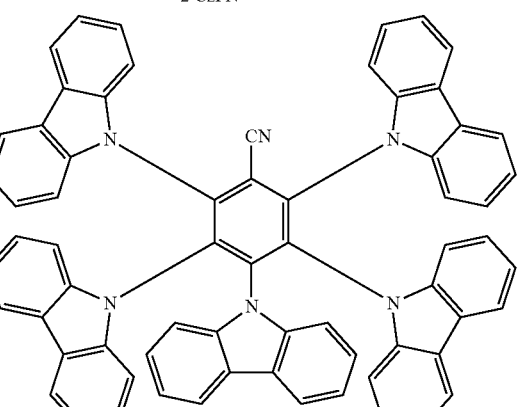
5 CzBN
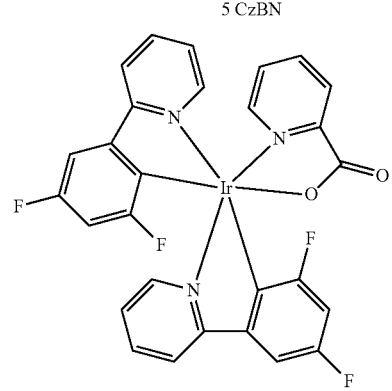
FIrpic
-continued
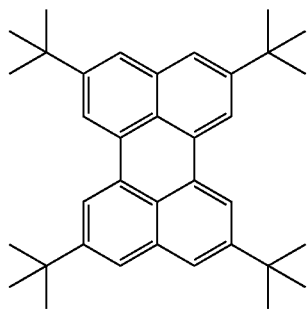
TBPe
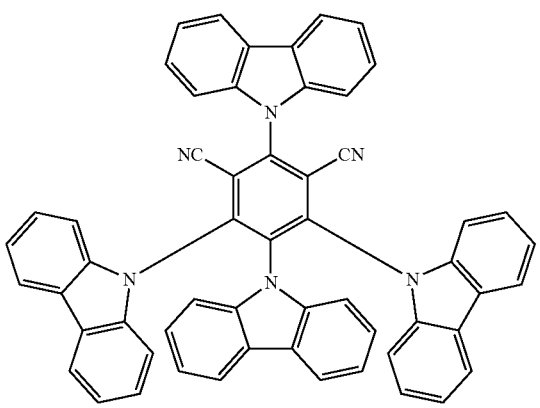
4 CzIPN
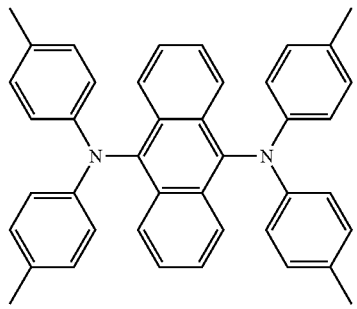
TTPA
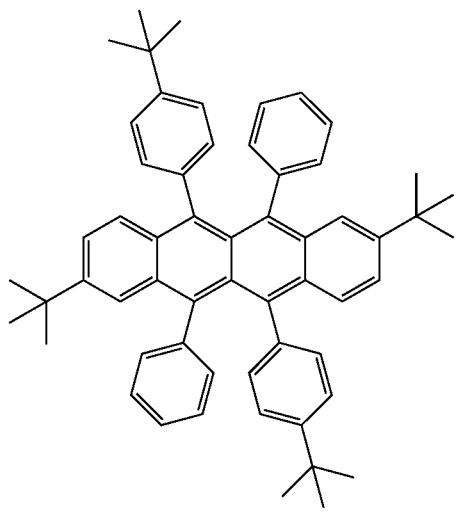
TBRb -continued

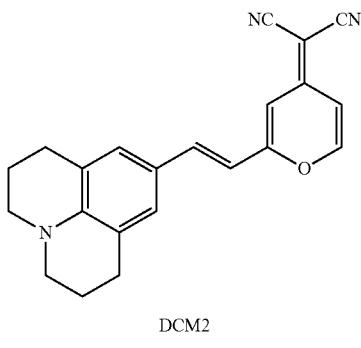

DCM2

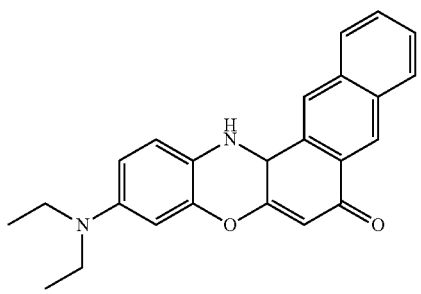

NileRed

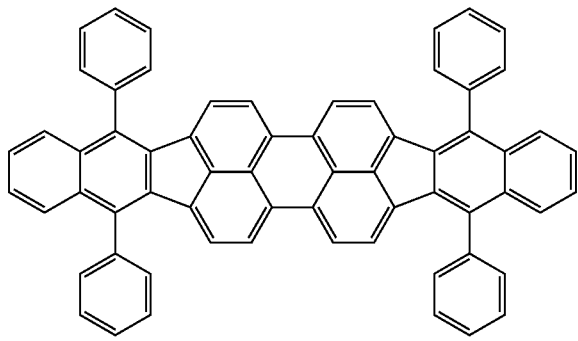

DBP

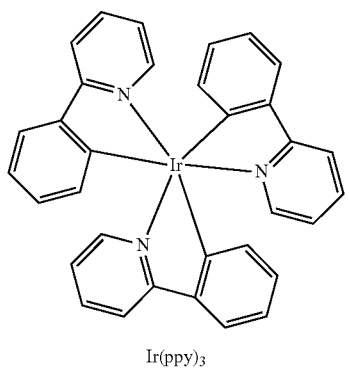

Ir(ppy)₃

-continued

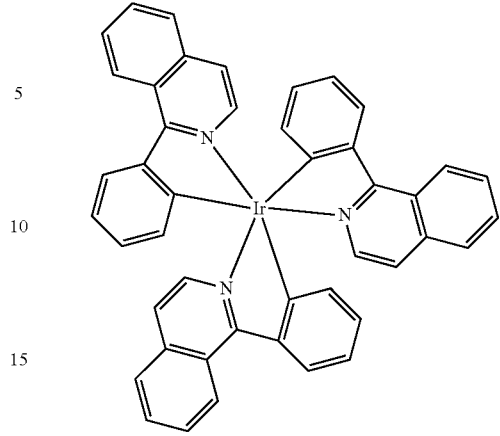

Ir(piq)₃

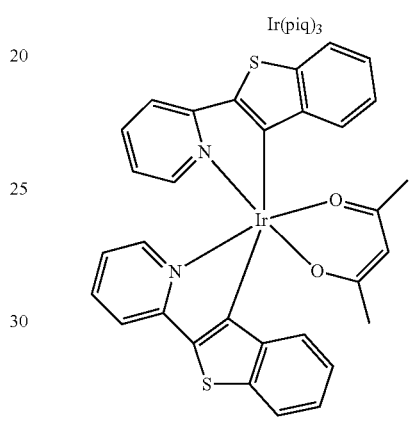

Ir(btp)₂(acac)

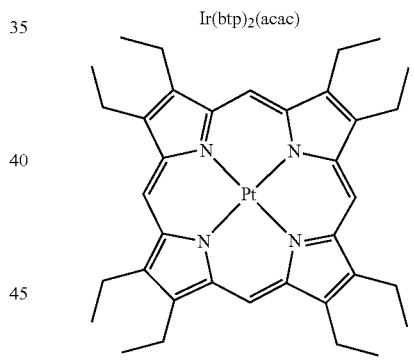

PtOEP

Figure 2:
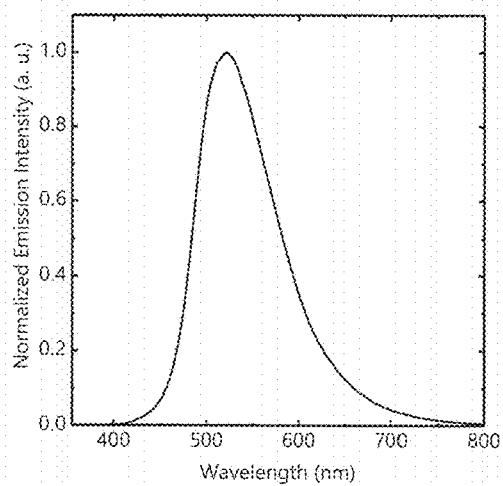
FIG. 2 Graphs showing a long-persistent luminescence spectrum of a TMB/PPT film and an emission lifetime characteristic thereof.
Figure 2:
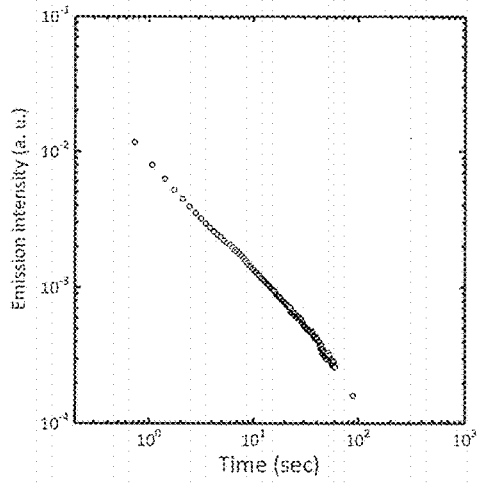

[1] Consideration of Combination of First Organic Compound and Second Organic Compound In a glove box with a nitrogen atmosphere, a quartz substrate was heated at a temperature not lower than the melting point of PPT (250° C. or higher), and PPT was melted on the quartz substrate. To the PPT melt, TMB was added at a concentration of 1 mol % and mixed, and then rapidly cooled to form a glassy, long-persistent luminescent material film, which was sealed with a glass substrate and a UV-curable resin. Irradiated with an excitation light at 340 nm, the formed film emitted light. Even after the light application was stopped, long-persistent luminescence still continued. FIG. 2 shows a long-persistent luminescence spectrum and an emission lifetime characteristic of the film. The peak wavelength of the long-persistent luminescence spectrum was 526 nm.

Figure 3:
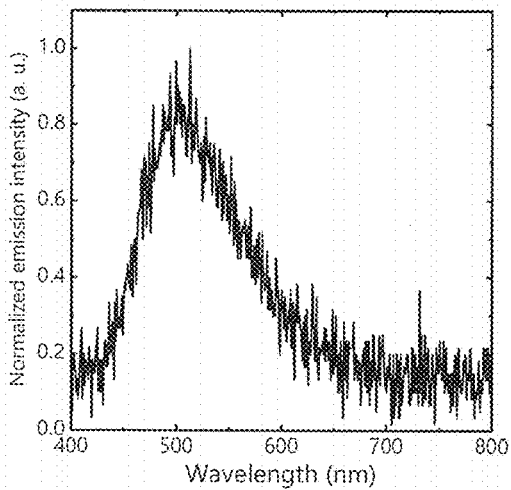
FIG. 3 Graphs showing a long-persistent luminescence spectrum of a m-MTDATA/PPT film and an emission lifetime characteristic thereof.
Figure 3:
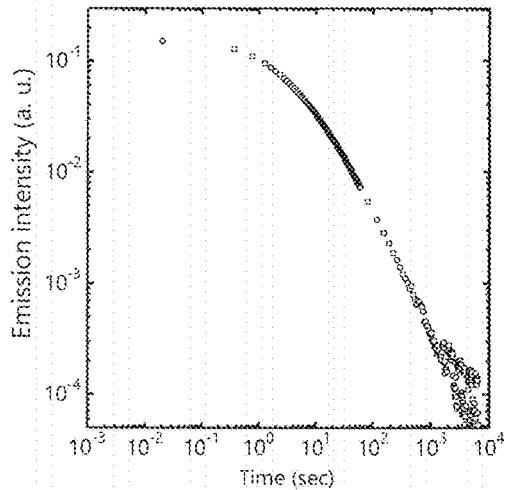
Figure 4:
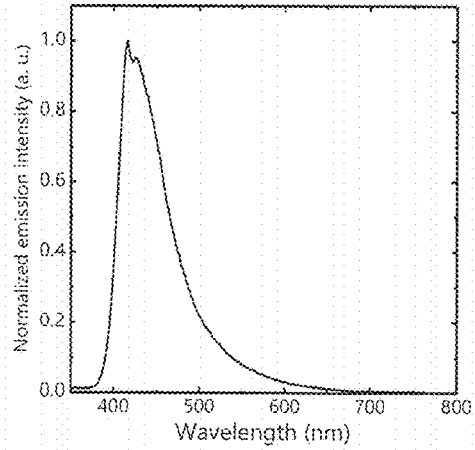
FIG. 4 Graphs showing a long-persistent luminescence spectrum of a CV/PPT film and an emission lifetime characteristic thereof.
Figure 4:
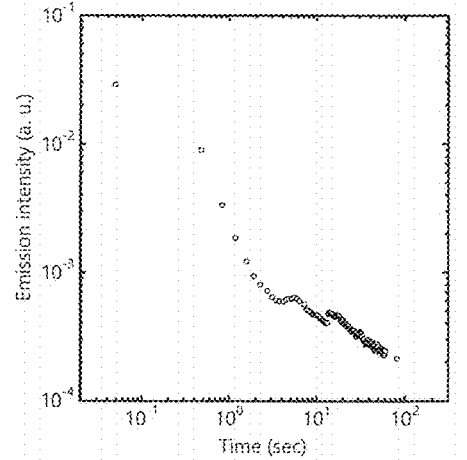

A glassy film was formed in the same manner as above except that m-MTDATA or CV was used in place of TMB. The film formed using m-MTDATA or CV gave long-persistent luminescence even after light application was stopped. FIG. 3 shows a long-persistent luminescence spectrum and an emission lifetime characteristic of the film using m-MTDATA, and FIG. 4 shows a long-persistent luminescence spectrum and an emission lifetime characteristic of the film using CV. The peak wavelength of the long-persistent luminescence spectrum of the film using m-MTDATA was 523 nm, and the peak wavelength of the long-persistent luminescence spectrum of the film using CV was 513 nm.

[2] Preparation and Characteristics Evaluation of Solution and Filmy Long-Persistent Luminescent Composition Examples 1 to 7, Comparative Examples 1 to 4

TMB was mixed with PPT in a ratio of 1 mol % to 99 mol %, heated and melted at a temperature not lower than the melting point of PPT (250° C. or higher), and then rapidly cooled to prepare a long-persistent luminescent material film. The lowest excited singlet energy level of emission from the film was measured to be $E_{S1}(A)$.

A toluene solution having a concentration of $10^{-5}$ mol/L of each of 4CzBN, 2CzPN, 5CzPN, FIrpic, TBPe, 4CzIPN, TTPA, TBRb, DCM2, NileRed, or DBP was prepared, and the lowest excited singlet energy level thereof was measured to determine $E_{S1}(B)$ of each compound. The results are shown in Table 1.

TMB was mixed with PPT in a ratio of 1 mol % to 98 mol %, and with a third compound 4CzBN in a ratio of 1 mol %, and heated and melted, and rapidly cooled to form a long-persistent luminescent film. In place of 4CzBN, any of 2CzPN, 5CzPN, FIrpic, TBPe, 4CzIPN, TTPA, TBRb, DCM2, NileRed, or DBP was used as the third compound, and a long-persistent luminescent film was prepared in the same manner.

Figure 5:
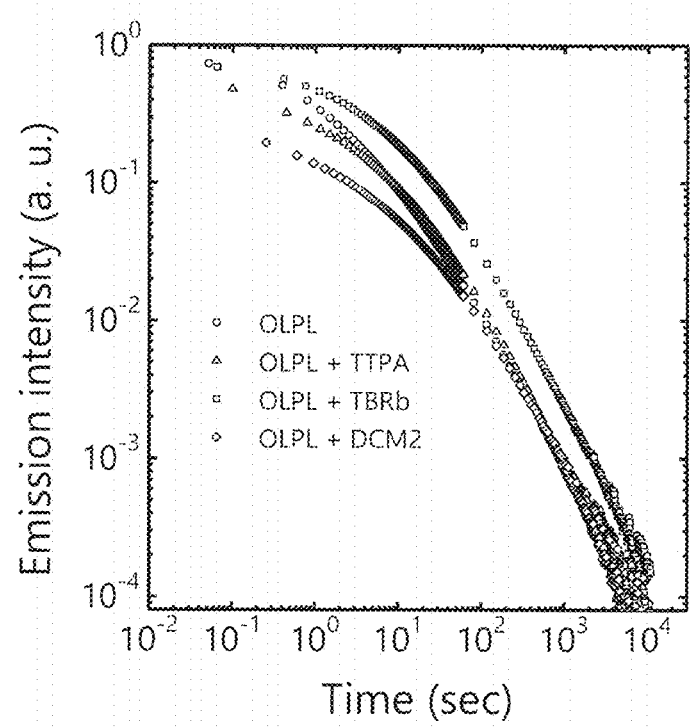
FIG. 5 A graph showing an emission lifetime characteristic of a TMB/PPT/TTPA film, a TMB/PPT/TBRb film and a TMB/PPT/DCM2 film.
Figure 6:
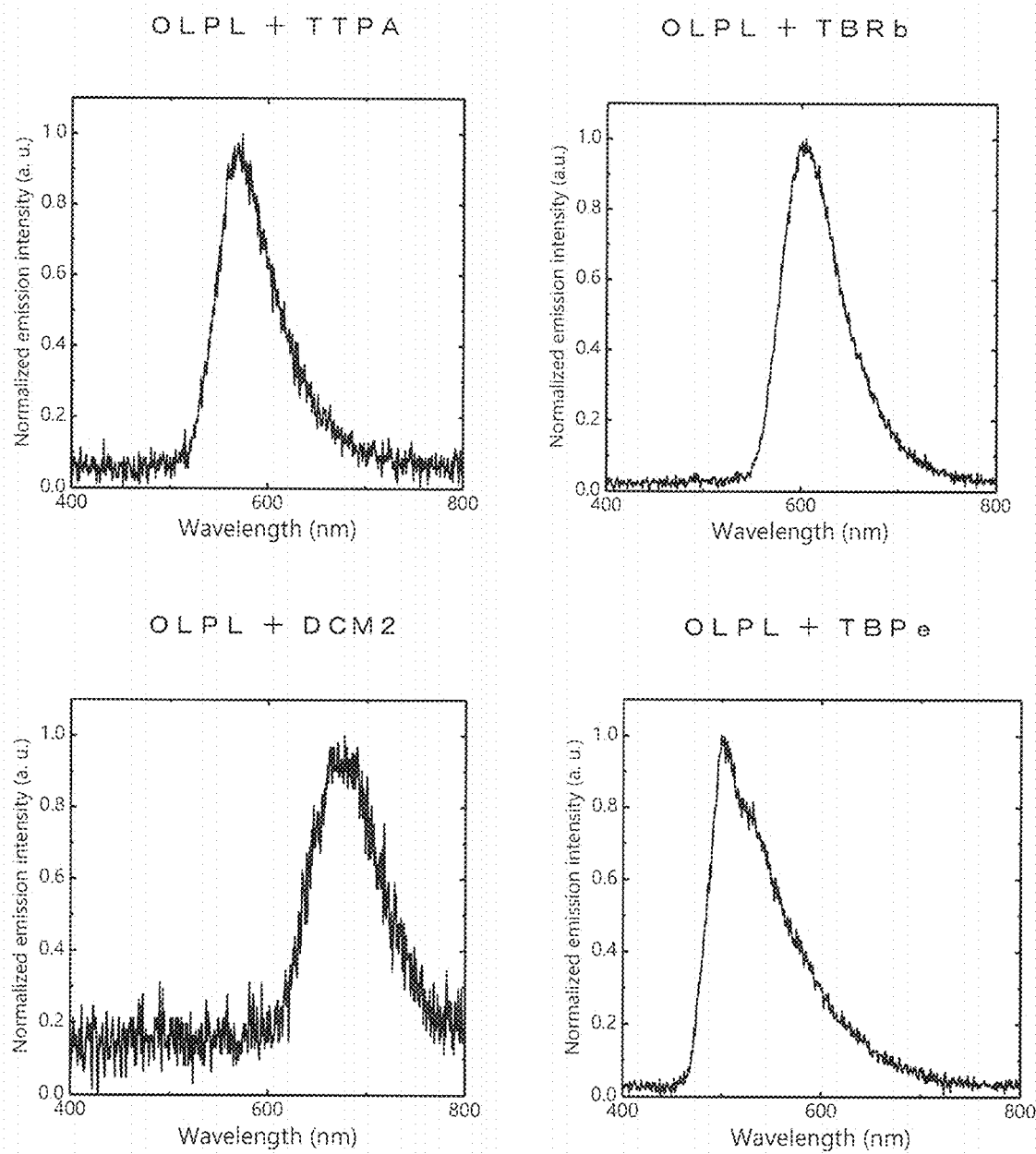
FIG. 6 Graphs showing a long-persistent luminescence spectrum of a TMB/PPT/TTPA film, a TMB/PPT/TBRb film, a TMB/PPT/DCM2 film and a TMB/PPT/TBPe film.

Thus prepared, each long-persistent luminescent film was irradiated with a 340-nm excitation light, and the film emitted light. All the long-persistent luminescent films gave long-persistent luminescence even after light application thereto was stopped. The long-persistent luminescence spectrum and the emission lifetime characteristic of each long-persistent luminescent film were analyzed to determine the peak wavelength and the full width at half maximum (FWHM) thereof. The results are shown in Table 1. As typical emission lifetime characteristics, FIG. 5 shows emission lifetime characteristics of long-persistent luminescent films each containing any of TTPA, TBRb, or DCM2. In the graph, "OLPL" is a combination of TMB/PPT. Also as typical long-persistent luminescence spectra, FIG. 6 shows long-persistent luminescence spectra of long-persistent luminescent films each containing any of TTPA, TBRb, DCM2, or TBPe. These long-persistent luminescence spectra obviously differ from the long-persistent luminescence spectrum of TMP/PPT, and the peak wavelength thereof shifted for emission wavelength control. In particular, the long-persistent luminescent films containing any of TTPA, TBRb or DCM2 having a negative value of $E_{S1}(B)-E_{S1}(A)$ of the expression (1) attained emission wavelength control to a long wavelength side, while on the other hand, the long-persistent luminescent film containing TBPe having a positive value of more than 0 and 0.15 eV or less of the expression $E_{S1}(B)-E_{S1}(A)$ attained emission wavelength control to a short wavelength side. On the other hand, however, the peak wavelength of the long-persistent luminescence spectrum of the long-persistent luminescent films containing any of 4CzBN, 2CzPN, 5CzPN, or FIrpic not satisfying the relationship of the expression (1) is the same as that of the TMB/PPT solution, which confirms that there occurred no energy transfer from TMP/PPT to these third organic compounds.

TABLE 1

| | Third Organic Compound | $E_{S1}(A)$ (eV) | $E_{S1}(B)$ (eV) | $E_{S1}(B) - E_{S1}(A)$ (eV) | Presence or Absence of Long-Persistent Luminescence | Peak Wavelength of Long-Persistent Luminescence Spectrum (nm) | Presence or Absence of Energy Transfer | FWHM (nm) |
|---|---|---|---|---|---|---|---|---|
| | no | 2.73 | — | — | yes | 526 | — | 125 |
| Comparative Example 1 | 4CzBN | — | 2.99 | 0.26 | yes | 528 | no | 111 |
| Comparative Example 2 | 2CzPN | — | 2.95 | 0.22 | yes | 527 | no | 96 |
| Comparative Example 3 | 5CzBN | — | 2.94 | 0.21 | yes | 520 | no | 111 |
| Comparative Example 4 | FIrpic | — | more than 2.88 | more than 0.15 | yes | 505 | no | 106 |
| Example 1 | TBPe | — | 2.82 | 0.09 | yes | 501 | yes | 76 |
| Example 2 | 4CzIPN | — | 2.73 | 0 | yes | 528 | yes | 98 |
| Example 3 | TTPA | — | 2.54 | −0.19 | yes | 569 | yes | 68 |
| Example 4 | TBRb | — | 2.36 | −0.37 | yes | 605 | yes | 67 |
| Example 5 | DCM2 | — | 2.36 | −0.37 | yes | 676 | yes | 85 |
| Example 6 | NileRed | — | 2.27 | −0.46 | yes | — | yes | — |
| Example 7 | DBP | — | 2.11 | −0.62 | yes | 661 | yes | 65 |

The long-persistent luminescent films produced in Examples 1, 3, 4 and 5 and the long-persistent luminescent film not having a third organic compound were analyzed to measure the photoluminescence quantum yield (PL quantum yield) with a 340-nm excitation light and a long-persistent luminescence time thereof. The results are shown in Table 2. Here, the long-persistent luminescence time is a time from the point at which application of excitation light has stopped to the point at which the emission intensity has reached less than 3 pW.

TABLE 2

| Example No | Third Organic Compound | PL Quantum Yield (%) | Long-Persistent Luminescence Time (sec) |
|---|---|---|---|
| — | no | 13 | 248 |
| Example 1 | TBPe | 33 | 300 |
| Example 3 | TTPA | 43 | 817 |

TABLE 2-continued

| Example No | Third Organic Compound | PL Quantum Yield (%) | Long-Persistent Luminescence Time (sec) |
|---|---|---|---|
| Example 4 | TBRb | 46 | 1415 |
| Example 5 | DCM2 | 40 | 862 |

As in Table 2, the long-persistent luminescent films of Examples having a third organic compound added thereto all had a higher photoluminescence quantum yield than that of the long-persistent luminescent film not having a third organic compound, and the long-persistent luminescence from the former continued longer than that from the latter. In particular, the long-persistent luminescent film of Example 4 having TBRb added thereto as a third organic compound attained a photoluminescence quantum yield of about 3.5 times that of the long-persistent luminescent material not having a third organic compound and a long-persistent luminescence time of about 6 times that of the latter. From this, it is found that adding a third organic compound to a long-persistent luminescent film dramatically improve and prolong the emission efficiency and the long-persistent luminescence time.

Example 8

TMB was mixed with PPT in a ratio of 1 mol % to 83 mol %, and with a third compound DCM2 in a ratio of 16 mol %, and heated and melted, and rapidly cooled to form a long-persistent luminescent film.

The long-persistent luminescent film was irradiated with a 340-nm excitation light, and emitted light having a peak wavelength of 711 nm. Even after the light application stopped, long-persistent luminescence still continued from the long-persistent luminescent film. The full width at half maximum (FWHM) of the emission peak was 134 nm. From these, it is found that, by adding a high concentration of DCM2 to a long-persistent luminescent film, the emission wavelength from the film shifts to a long wavelength side and the film can therefore realize near IR emission.

(Comparative Example 5) Production of Film of PPT and TTPA

In a glove box with a nitrogen atmosphere, a quartz substrate was heated at a temperature not lower than the melting point of PPT (250° C. or higher), and PPT was melted on the quartz substrate. To the PPT melt, TTPA was added at a concentration of 1 wt % and mixed, and then rapidly cooled to form a glassy, long-persistent luminescent material film, which was sealed with a glass substrate and a UV-curable resin.

(Comparative Example 6) Production of Film of PPT and DCM2

Figure 7:
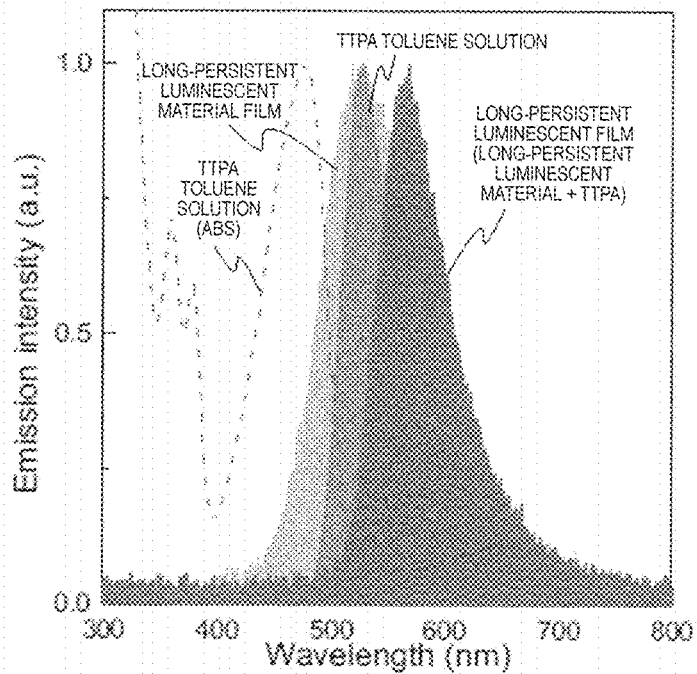
FIG. 7 A graph showing an emission spectrum of a TMB/PPT/TTPA film, a TMB/PPT film and a TTPA toluene solution, and a photoabsorption spectrum of a TTPA toluene solution.
Figure 8:
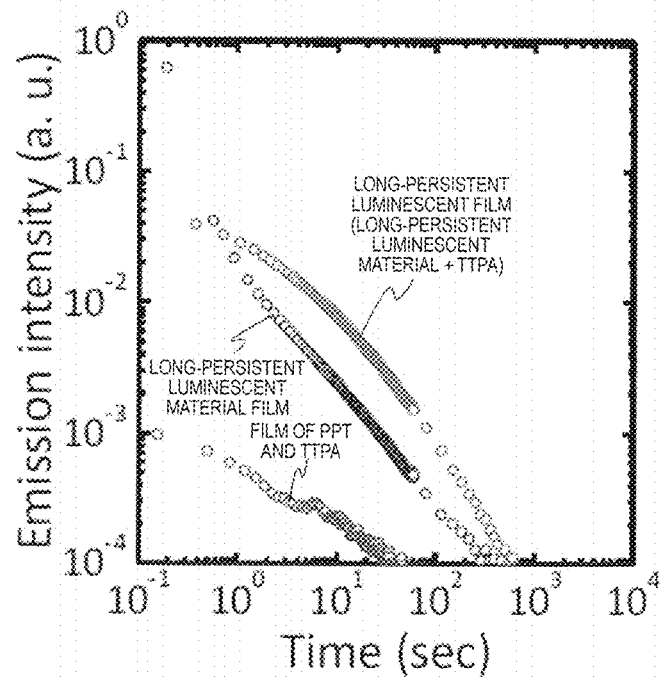
FIG. 8 A graph showing an emission lifetime characteristic of a TMB/PPT/TTPA film, a TMB/PPT film and a film containing TTP and TTPA.

A film was produced in the same manner as in Comparative Example 1 except that DCM2 was used in place of TTPA FIG. 7 is a graph showing emission spectra with a 340-nm excitation light of the long-persistent luminescent material film formed of TMB and PPT, the long-persistent luminescent film of TMB/PPT/TTPA produced in Example 3, and a TTPA toluene solution ($10^{-5}$ mol/L), and a photoabsorption spectrum of a TTPA toluene solution; FIG. 8 shows measurement results of the emission lifetime of the long-persistent luminescent film, the long-persistent luminescent material film, and the film of PPT and TTPA produced in Comparative Example 5.

Figure 9:
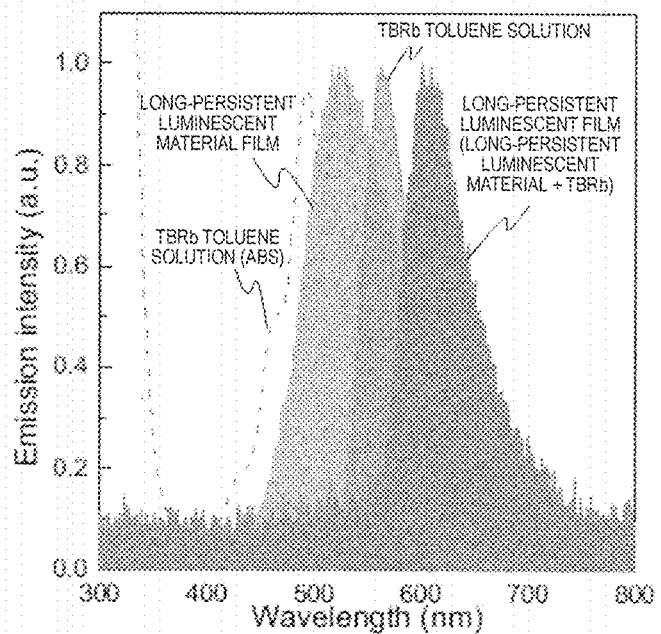
FIG. 9 A graph showing an emission spectrum of a TMB/PPT/TBRb film, a TMB/PPT film and a TBRb toluene solution, and a photoabsorption spectrum of a TBRb toluene solution.
Figure 10:
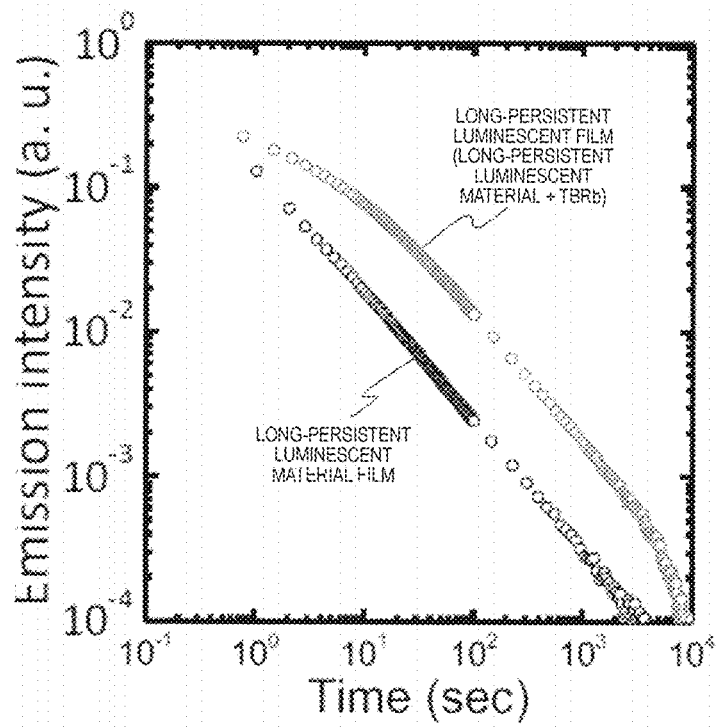
FIG. 10 A graph showing an emission lifetime characteristic of a TMB/PPT/TBRb film and a TMB/PPT film.

FIG. 9 shows emission spectra with a 340-nm excitation light of the long-persistent luminescent material film of TMB and PPT, the long-persistent luminescent film of TMB/PPT/TBRb produced in Example 4, and a TBRb toluene solution ($10^{-5}$ mol/L), and a photoabsorption spectrum of a TBRb toluene solution; and FIG. 10 shows measurement results of emission lifetime data of the long-persistent luminescent film and the long-persistent luminescent material film.

Figure 11:
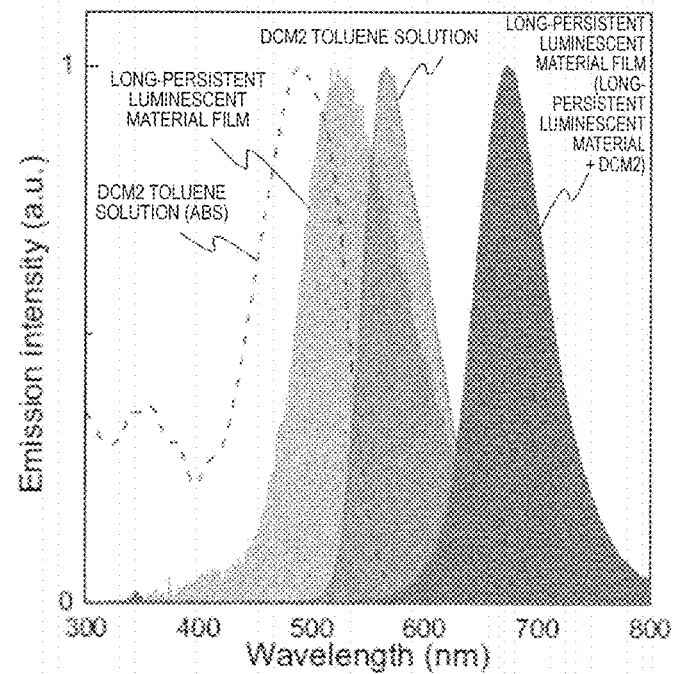
FIG. 11 A graph showing an emission spectrum of a TMB/PPT/DCM2 film, a TMB/PPT film and a DCM2 toluene solution, and a photoabsorption spectrum of a DCM2 toluene solution.
Figure 12:
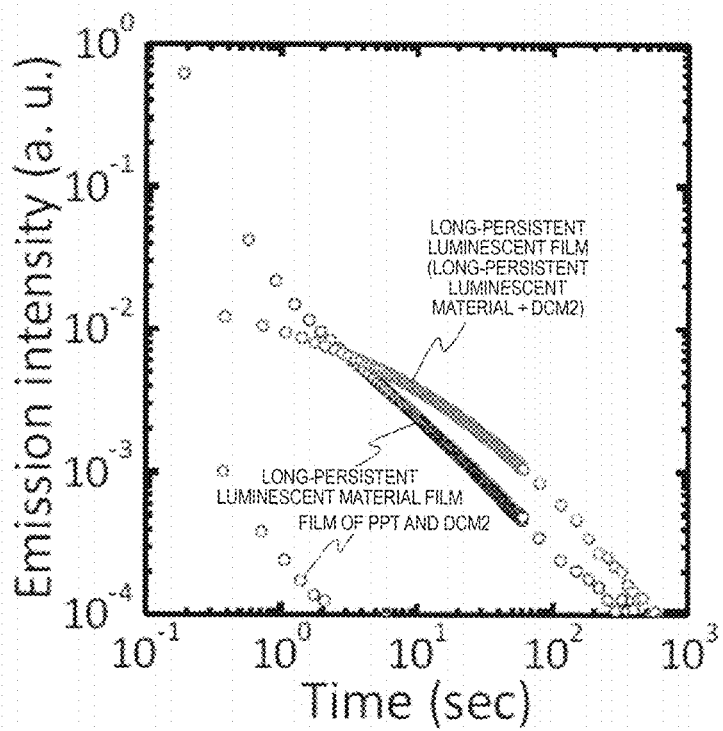
FIG. 12 A graph showing an emission lifetime characteristic of a TMB/PPT/DCM2 film, a TMB/PPT film, and a PPT/DCM2 film.

FIG. 11 shows emission spectra with a 340-nm excitation light of the long-persistent luminescent material film of TMB and PPT, the long-persistent luminescent film of TMB/PPT/DCM2 produced in Example 5, and a DCM2 toluene solution ($10^{-5}$ mol/L), and a photoabsorption spectrum of a DCM2 toluene solution; and FIG. 12 shows measurement results of emission lifetime of the long-persistent luminescent film, the long-persistent luminescent material film and the film of PPT and DCM2 produced in Comparative Example 6.

In FIGS. 7, 9 and 11, the dotted line represents a photoabsorption spectrum, and the other waves are emission spectra.

With reference to FIGS. 7, 9 and 11, it is found that the emission peak of the long-persistent luminescent film containing a long-persistent luminescent material and a third organic compound shifts to a long wavelength side than the emission peak of the long-persistent luminescent material film and the toluene solution of a third organic compound. From this, it is found that combined use of a long-persistent luminescent material and a third organic compound gives an emission color having a longer wavelength, which, however, could not be attained by a long-persistent luminescent material or a third organic compound alone, and such combined use enables emission color control in a broad wavelength range. In particular, it is an extremely breakthrough solution that red color emission, which could hardly be realized by an inorganic long-persistent luminescent material, can be observed at a high color purity (see FIG. 11).

From FIGS. 8, 10 and 12, it is found that the long-persistent luminescent films produced in Examples have a longer lifetime and an improved emission intensity than those of long-persistent luminescent material films.

(Example 9) Production of White Emission Film

Figure 13:
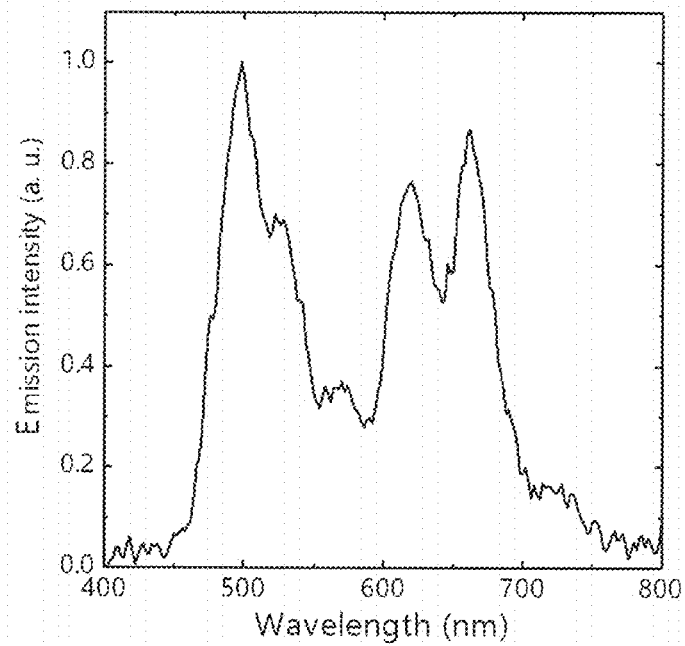
FIG. 13 An emission spectrum of a TMB/PPT/TBPe/DBP film.
Figure 14:
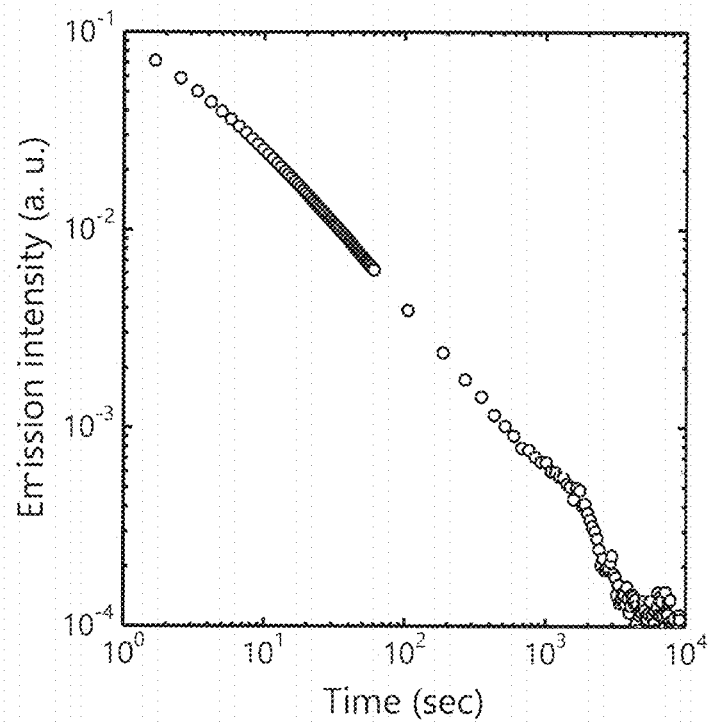
FIG. 14 A graph showing an emission lifetime characteristic of a TMB/PPT/TBPe/DBP film.

One equivalent of TMB, 99 equivalents of PPT, 1 equivalent of TBPe and 0.01 equivalents of DBP were mixed, melted under heat, and rapidly cooled to prepare a long-persistent luminescent film. Irradiated with a 340-nm excitation light, the formed long-persistent luminescent film gave white emission having a CIE coordinate (x=0.37, y=0.42). FIG. 13 shows an emission spectrum of the film and FIG. 14 shows measurement results of the emission lifetime of the film.

In Example 9, a green-blue emitter TBPe and a red emitter DBP were used as combined as a third compound, and therefore realized white emission.

Examples 10 to 13

In Examples 10 to 13, a phosphorescent material was used as a third organic compound. Of the phosphorescent material, the lowest excited singlet energy level $E_{S1}(B)$ could not be measured, and therefore the lowest excited triplet energy level $E_{T1}(B)$ thereof was used as an index of $E_{S1}(B)$. Of an ordinary phosphorescent material, the lowest excited singlet energy level and the lowest excited triplet energy level do not extremely separate from each other, and therefore, so far as $E_{T1}(B)-E_{S1}(A)$ is less than −0.1 eV, preferably less than −0.3 eV, it can be considered that $E_{S1}(B)-E_{S1}(A) \leq 0.15$ eV.

Specifically, first, a chloroform solution of each of Ir(ppy)$_3$, Ir(piq)$_3$, Ir(btp)$_2$(acac), or PtOEP was prepared so as to have a concentration of $10^{-5}$ mol/L, the resultant solution is irradiated with a 380-nm excitation light and the lowest excited triplet energy level $E_{T1}(B)$ thereof was measured. The results are shown in Table 3.

PPT was mixed with TMB in a ratio of 98 mol % to 1 mol %, and then with a third compound Ir(ppy)$_3$ in a ratio of 1 mol %, melted under heat and then rapidly cooled to give a long-persistent luminescent film. Further, in place of Ir(ppy)$_3$, any of Ir(piq)$_3$, Ir(btp)$_2$(acac), or PtOEP was used as the third compound and long-persistent luminescent films were produced in the same manner.

Thus produced, each long-persistent luminescent film was irradiated with a 340-nm excitation light, and the film emitted light. All the long-persistent luminescent films gave long-persistent luminescence even after light application thereto was stopped. The long-persistent luminescence spectrum of each long-persistent luminescent film was analyzed to determine the peak wavelength and the full width at half maximum (FWHM) thereof. The results are shown in Table 3. As in Table 3, the peak wavelength of these films shifted to a long wavelength side from the peak wavelength of TMB/PPT (example with "no" third organic compound in Table 3), which confirmed emission wavelength control by these films.

the long-persistent luminescent material having a long-persistent luminescence time of 0.1 seconds or more, the first organic compound, the second organic compound and the third organic compound satisfy the following expression (1):

$$E_{S1}(B)-E_{S1}(A) \leq 0.15 \text{ eV} \quad (1)$$

wherein $E_{S1}(A)$ represents a lowest excited singlet energy level determined by emission from a film consisting of the first organic compound and the second organic compound, $E_{S1}(B)$ represents a lowest excited singlet energy level of the third organic compound, and the unit of $E_{S1}(A)$ and $E_{S1}(B)$ is eV, and HOMO of the first organic compound is higher than HOMO of the second organic compound, and LUMO of the first organic compound is higher than the LUMO of the second organic compound.

2. The long-persistent luminescent composition according to claim 1, satisfying the following expression (2):

$$0 \text{ eV} < E_{S1}(B)-E_{S1}(A) \leq 0.15 \text{ eV} \quad (2).$$

3. The long-persistent luminescent composition according to claim 1, satisfying the following expression (3):

$$E_{S1}(B)-E_{S1}(A) < 0 \text{ eV} \quad (3).$$

4. The long-persistent luminescent composition according to claim 1, wherein the first organic compound and the second organic compound form an exciplex through application of light to the long-persistent luminescent composition.

5. The long-persistent luminescent composition according to claim 1, wherein the first organic compound is an electron-donating compound, and the second organic compound is an electron-accepting compound.

TABLE 3

| | Third Organic Compound | $E_{S1}(A)$ (eV) | $E_{T1}(B)$ (eV) | $E_{T1}(B) - E_{S1}(A)$ (eV) | Presence or Absence of Long-Persistent Luminescence | Peak Wavelength of Long-Persistent Luminescence Spectrum (nm) | Presence or Absence of Energy Transfer | FWHM (nm) |
|---|---|---|---|---|---|---|---|---|
| | no | 2.73 | — | — | yes | 526 | — | 125 |
| Example 10 | Ir(ppy)$_3$ | — | 2.58 | −0.15 | yes | 544 | yes | 66 |
| Example 11 | Ir(piq)$_3$ | — | 2.15 | −0.58 | yes | 664 | yes | 86 |
| Example 12 | Ir(btp)$_2$(acac) | — | 2.11 | −0.62 | yes | 630, 646 | yes | 97 |
| Example 13 | PtOEP | — | 1.97 | −0.76 | yes | 649 | yes | 19 |

INDUSTRIAL APPLICABILITY

The long-persistent luminescent composition of the present invention facilitates emission color control, and can emit a red light at a high color purity, which, however, could not be realized by already-existing inorganic long-persistent luminescent materials, and can also realize a white light. Consequently, according to the present invention, long-persistent luminescent materials with a variety of emission colors can be realized. Accordingly, the industrial applicability of the long-persistent luminescent composition of the present invention is great.

The invention claimed is:

1. A long-persistent luminescent composition comprising a long-persistent luminescent material composed of a first organic compound and a second organic compound; and a third organic compound selected from a fluorescent material, a phosphorescent material and a delayed fluorescent material, wherein:

6. The long-persistent luminescent composition according to claim 1, wherein the third organic compound is a plurality of organic molecules aggregated so as to form an excimer.

7. The long-persistent luminescent composition according to claim 1, wherein the third organic compound is a fluorescent material.

8. A long-persistent luminescent device having a long-persistent luminescent composition of claim 1 on a support.

9. A method of controlling an emission wavelength of a long-persistent luminescent material that contains a first organic compound and a second organic compound, which comprises:

adding a third organic compound selected from a fluorescent material, a phosphorescent material and a delayed fluorescent material, wherein the first organic compound, the second organic compound and the third organic compound satisfy the following expression (1) to the long-persistent luminescent material:

$$E_{S1}(B)-E_{S1}(A) \leq 0.15 \text{ eV} \quad (1)$$

wherein $E_{S1}(A)$ represents a lowest excited singlet energy level determined by emission from film consisting of the first organic compound and the second organic compound, $E_{S1}(B)$ represents a lowest excited singlet energy level of the third organic compound, and the unit of $E_{S1}(A)$ and $E_{S1}(B)$ is eV, wherein HOMO of the first organic compound is higher than HOMO of the second organic compound, and LUMO of the first organic compound is higher than the LUMO of the second organic compound, and wherein the long-persistent luminescent material has a long-persistent luminescence time of 0.1 seconds or more.

10. The wavelength control method according to claim 9, wherein the third organic compound satisfies the following expression (2):

$$0 \text{ eV} < E_{S1}(B) - E_{S1}(A) \leq 0.15 \text{ eV} \qquad (2).$$

11. The wavelength control method according to claim 10, wherein the emission wavelength of the long-persistent luminescent material is controlled to a shorter wavelength side by adding the third compound than before the addition.

12. The wavelength control method according to claim 9, wherein the third organic compound satisfies the following expression (3):

$$E_{S1}(B) - E_{S1}(A) < 0 \text{ eV} \qquad (3).$$

13. The wavelength control method according to claim 12, wherein the emission wavelength of the long-persistent luminescent material is controlled to a longer wavelength side by adding the third compound than before the addition.

* * * * *